United States Patent
Lee et al.

(10) Patent No.: US 11,657,137 B2
(45) Date of Patent: May 23, 2023

(54) ELECTRONIC DEVICE AND AUTHENTICATION METHOD OF ELECTRONIC DEVICE

(71) Applicant: Samsung Electronics Co., Ltd., Gyeonggi-do (KR)

(72) Inventors: Jaewook Lee, Gyeonggi-do (KR); Junghun Kim, Gyeonggi-do (KR); Youngho Rhee, Gyeonggi-do (KR); Yongsang Yun, Gyeonggi-do (KR); Cheolho Cheong, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 347 days.

(21) Appl. No.: 17/007,231

(22) Filed: Aug. 31, 2020

(65) Prior Publication Data
US 2021/0064736 A1 Mar. 4, 2021

(30) Foreign Application Priority Data
Sep. 4, 2019 (KR) ........................ 10-2019-0109772

(51) Int. Cl.
*G06F 21/44* (2013.01)
*H02J 50/80* (2016.01)
(Continued)

(52) U.S. Cl.
CPC .............. *G06F 21/44* (2013.01); *H02J 50/12* (2016.02); *H02J 50/80* (2016.02); *H04L 67/02* (2013.01); *H04W 4/80* (2018.02)

(58) Field of Classification Search
CPC ........... G06F 21/44; H02J 50/80; H02J 50/12; H04W 4/80; H04L 67/02
(Continued)

(56) References Cited

U.S. PATENT DOCUMENTS 7,734,279 B2 * 6/2010 Fantini ................ H04L 63/0853
370/230
10,609,620 B1 * 3/2020 Wong .................... H04L 45/122
(Continued)

FOREIGN PATENT DOCUMENTS

JP 2015-520593 A 7/2015
JP 2020-188547 A 11/2020
(Continued)

OTHER PUBLICATIONS

Strommer,"NFC-enabled Wireless Charging", Mar. 2012, Proceedings of the 4th International Workshop on Near Field Communication, pp. 1-6 (Year: 2012).*
(Continued)

*Primary Examiner* — Noura Zoubair
*Assistant Examiner* — Gregory A Lane
(74) *Attorney, Agent, or Firm* — Cha & Reiter, LLC

(57) ABSTRACT

According to certain embodiments, an authentication method of an electronic device, comprises responsive to detecting an external electronic device using a first communication circuit, transmitting first data to the external electronic device using a second communication circuit; determining whether a response to the first data is received; and when the response to the first data is received from the external electronic device, performing communication connection and authentication procedures with the external electronic device.

8 Claims, 17 Drawing Sheets

(51) Int. Cl.
   *H04L 67/02* (2022.01)
   *H04W 4/80* (2018.01)
   *H02J 50/12* (2016.01)

(58) Field of Classification Search
   USPC .......................................................... 726/2
   See application file for complete search history.

(56) References Cited

U.S. PATENT DOCUMENTS

| | | | |
|---|---|---|---|
| 2006/0287763 A1* | 12/2006 | Ochi | G06Q 40/00 |
| | | | 700/231 |
| 2013/0214732 A1 | 8/2013 | Nowottnick | |
| 2013/0234661 A1 | 9/2013 | Yang et al. | |
| 2014/0325218 A1 | 10/2014 | Shimizu | |
| 2014/0354223 A1* | 12/2014 | Lee | H04B 7/24 |
| | | | 320/108 |
| 2014/0366125 A1* | 12/2014 | Murata | H04W 12/06 |
| | | | 726/17 |
| 2015/0006395 A1 | 1/2015 | Chu | |
| 2015/0022018 A1 | 1/2015 | Kim et al. | |
| 2015/0052195 A1* | 2/2015 | Li | H04L 67/34 |
| | | | 709/203 |
| 2015/0304800 A1 | 10/2015 | Son et al. | |
| 2016/0050563 A1 | 2/2016 | Bronk | |
| 2016/0056662 A1 | 2/2016 | Toon | |
| 2016/0126748 A1 | 5/2016 | Park et al. | |
| 2016/0365747 A1 | 12/2016 | Redding | |
| 2018/0249502 A1* | 8/2018 | Yoshimura | H04W 52/18 |
| 2019/0267849 A1 | 8/2019 | Ha et al. | |
| 2020/0044491 A1* | 2/2020 | Qiu | H02J 50/40 |
| 2021/0211424 A1* | 7/2021 | Zheng | G06F 3/0673 |

FOREIGN PATENT DOCUMENTS

| | | |
|---|---|---|
| KR | 10-2012-0074458 A | 7/2012 |
| KR | 10-1976034 B1 | 4/2019 |
| KR | 10-1994737 B1 | 6/2019 |
| KR | 10-2022707 B1 | 9/2019 |
| WO | 2012/081858 A2 | 6/2012 |

OTHER PUBLICATIONS

International Search Report dated Dec. 4, 2020.

* cited by examiner

ELECTRONIC DEVICE AND AUTHENTICATION METHOD OF ELECTRONIC DEVICE

CROSS-REFERENCE TO RELATED APPLICATION(S)

This application is based on and claims priority under 35 U.S.C. 119 to Korean Patent Application No. 10-2019-0109772, filed on Sep. 4, 2019, in the Korean Intellectual Property Office, the disclosure of which is herein incorporated by reference in its entirety.

BACKGROUND

1) Field

Certain embodiments relate to an electronic device capable of transmitting power wirelessly and a method for authenticating an electronic device.

2) Description of Related Art

An electronic device may perform wireless charging or contactless charging. Wireless charging or contactless charging may use technology in which a battery of a chargeable device is charged by wireless transmission of power from a wireless charger to a chargeable device without a connection between the chargeable device and the wireless charger by a separate connector. The above information is presented as background information only to assist with an understanding of the disclosure. No determination has been made, and no assertion is made, as to whether any of the above might be applicable as prior art with regard to the disclosure.

SUMMARY

Although certain embodiments have been described with a degree of particularity, it should be understood that such embodiments can modified, and altered, have elements substituted or omitted, and changed in a variety of ways without departing from the scope of the disclosure as defined by the following claims and equivalents, thereof. Therefore, the embodiments are presented by way of example, and should be not be considered as limiting.

According to certain embodiments, an electronic device comprises a first communication circuit capable of performing communication using a coil for wireless power transmission; a second communication circuit using a frequency band differing from a frequency transferred to the coil; and at least one processor, wherein the at least one processor: detects an external electronic device using the first communication circuit; when the external electronic device is detected, transmits first data to the external electronic device by using the second communication circuit; determines whether a response to the first data is received; and when the response to the first data is received from the external electronic device, performs communication connection and authentication procedures with the external electronic device.

According to certain embodiments, an electronic device may include: a first communication circuit capable of performing communication using a coil for wireless power transmission; a second communication circuit using a frequency band differing from a frequency transferred to the coil; and a processor, wherein the processor: determines whether an external electronic device is detected using the first communication circuit; if the external electronic device is detected using the first communication circuit, transmits first data to the external electronic device by using the second communication circuit; determines whether a response to the first data is received; and if the response to the first data is received from the external electronic device, performs communication connection and authentication procedures with the external electronic device.

BRIEF DESCRIPTION OF THE DRAWINGS

For a more complete understanding of the disclosure and its advantages, reference is now made to the following description taken in conjunction with the accompanying drawings, in which like reference numerals represent like parts.

DETAILED DESCRIPTION

Wireless power transfer technology may include a magnetic induction scheme and a magnetic resonance scheme, and may include various types of wireless power transfer technology. When data is processed by a communication protocol using a wireless charging coil, it is difficult to process promised authentication between a charging device and chargeable device due to limitations in data transmission amount and speed. According to certain embodiments, a method performs an authentication operation using a communication protocol different from a communication protocol using a wireless charging coil. According to certain embodiments, an authentication operation may be performed using various communication protocols.

An electronic device capable of wireless power transmission and a method for authenticating an electronic device according to certain embodiments can improve a device authentication speed by performing an authentication operation using a communication protocol different from a communication protocol associated with using wireless charging coil.

The electronic device capable of wireless power transmission and the method for authenticating an electronic device according to certain embodiments can improve accuracy of device authentication by performing an authentication operation using a communication protocol different from a communication protocol associated with using a wireless charging coil.

Figure 1:
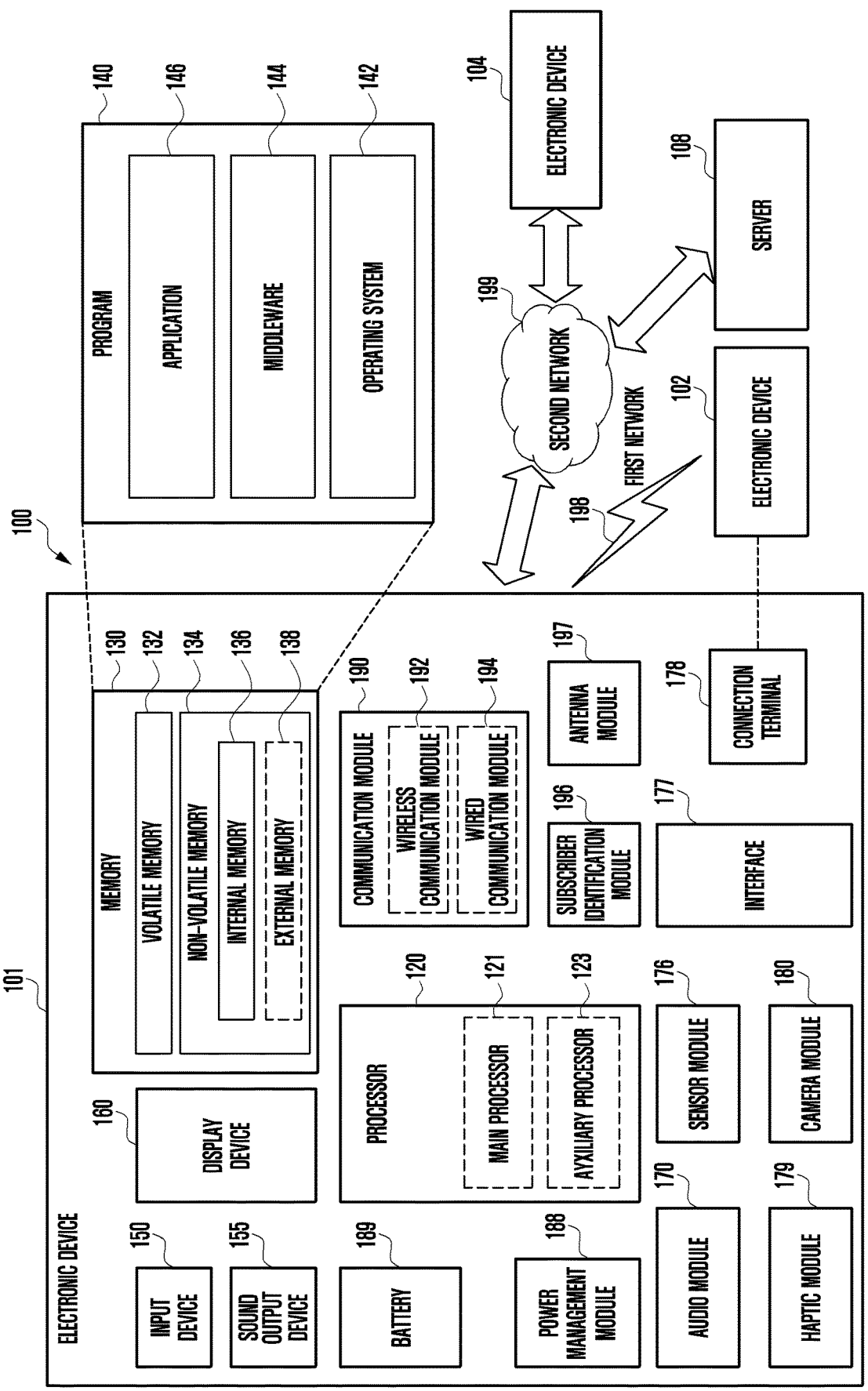
FIG. 1 is a block diagram of an electronic device that receives power wirelessly in a network environment according to certain embodiments.
Figure 2:
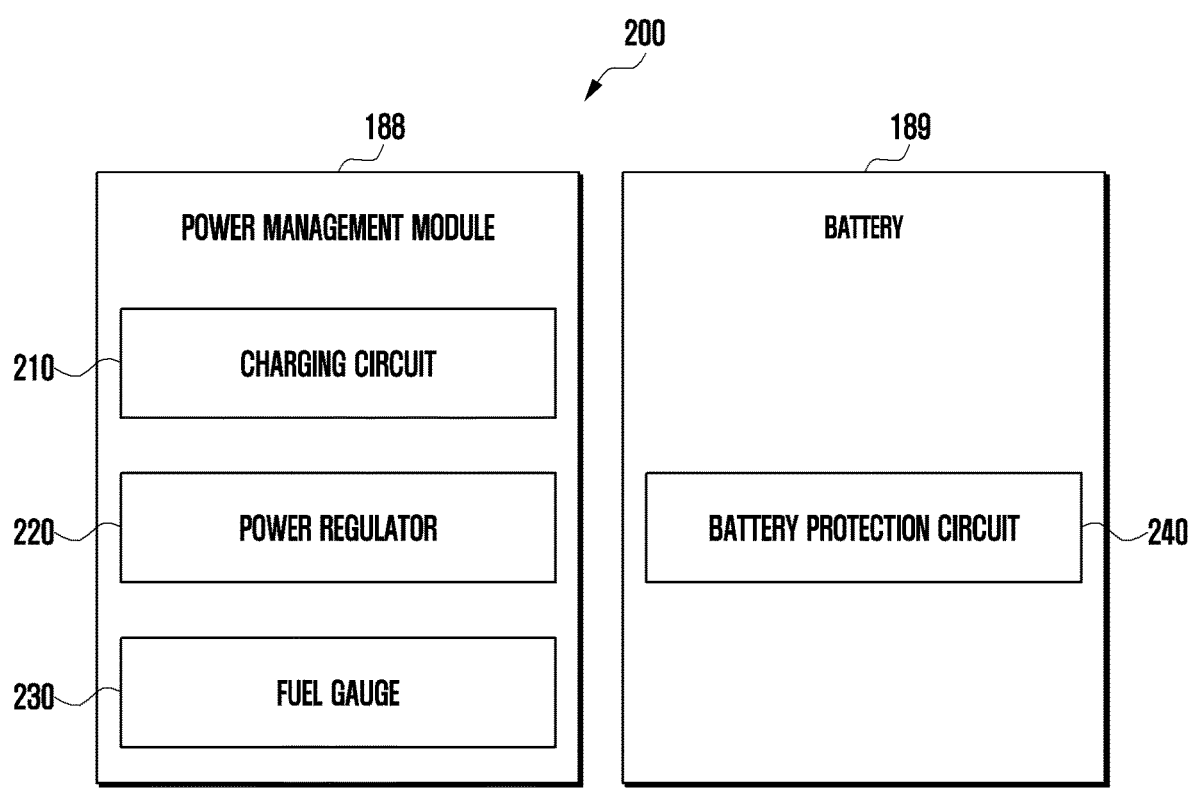
FIG. 2 is a block diagram for a power management module and a battery according to certain embodiments.
Figure 3:
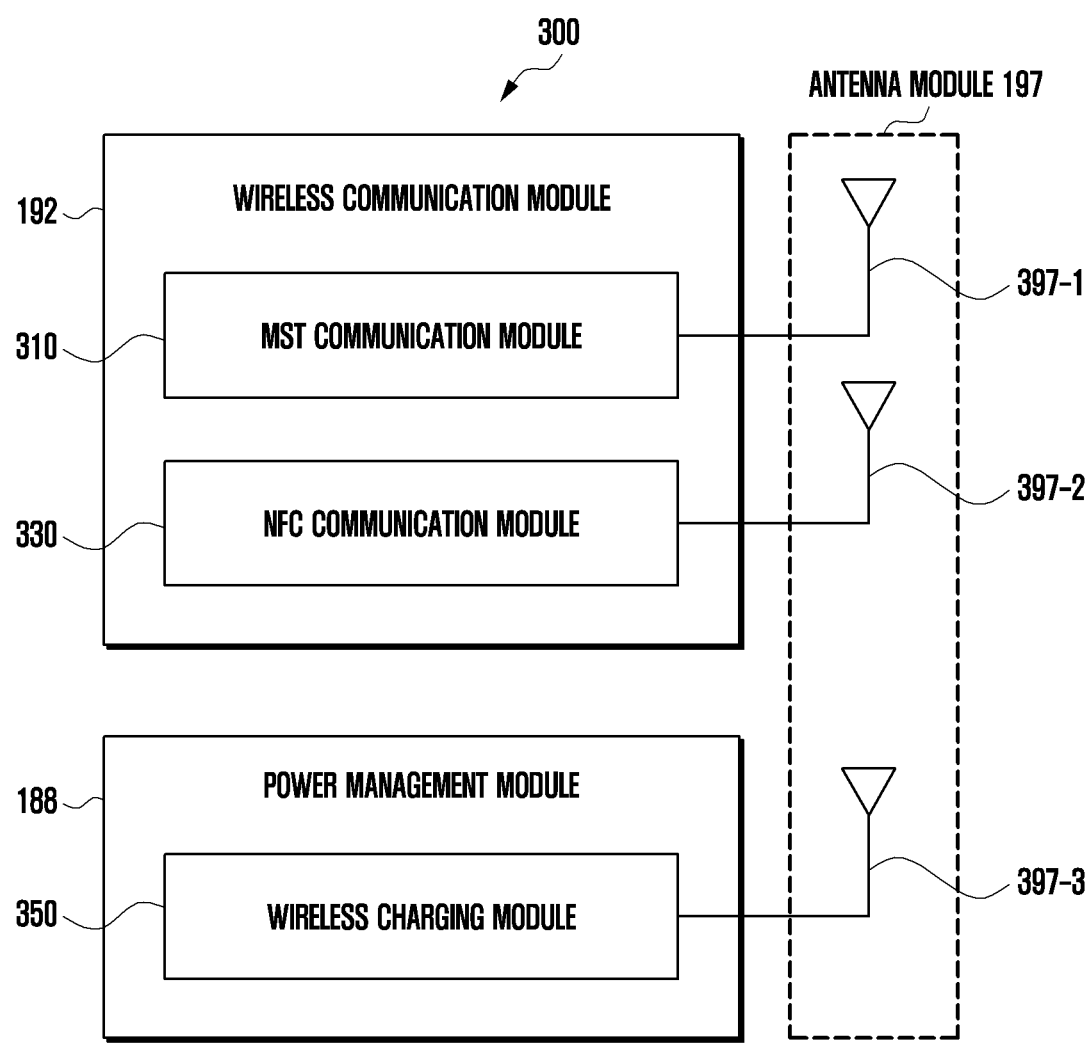
FIG. 3 is a block diagram for a wireless communication module, a power management module, and an antenna module of the electronic device.
Figure 4A:
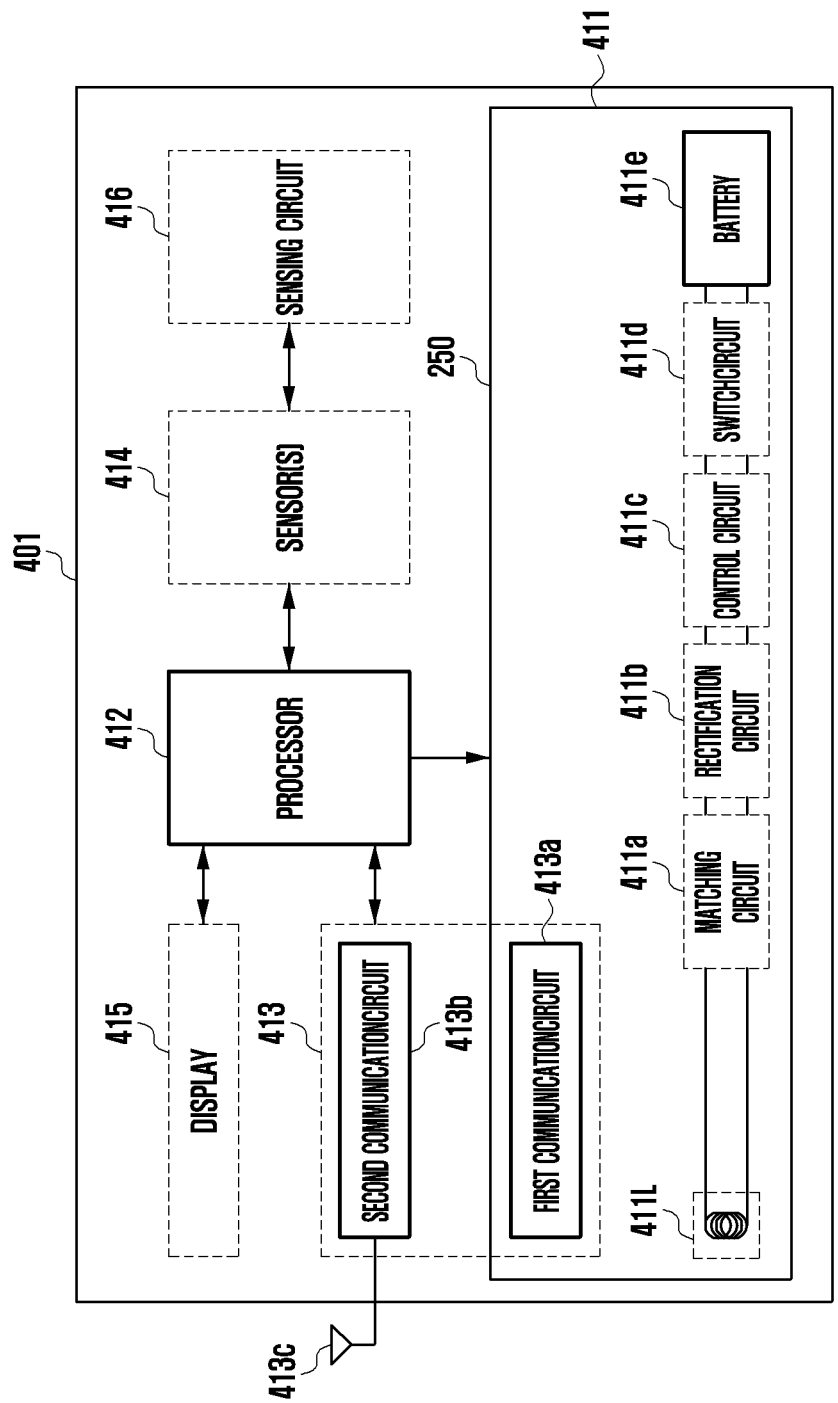
FIG. 4A is a schematic block diagram illustrating a first electronic device according to certain embodiments.
Figure 4B:
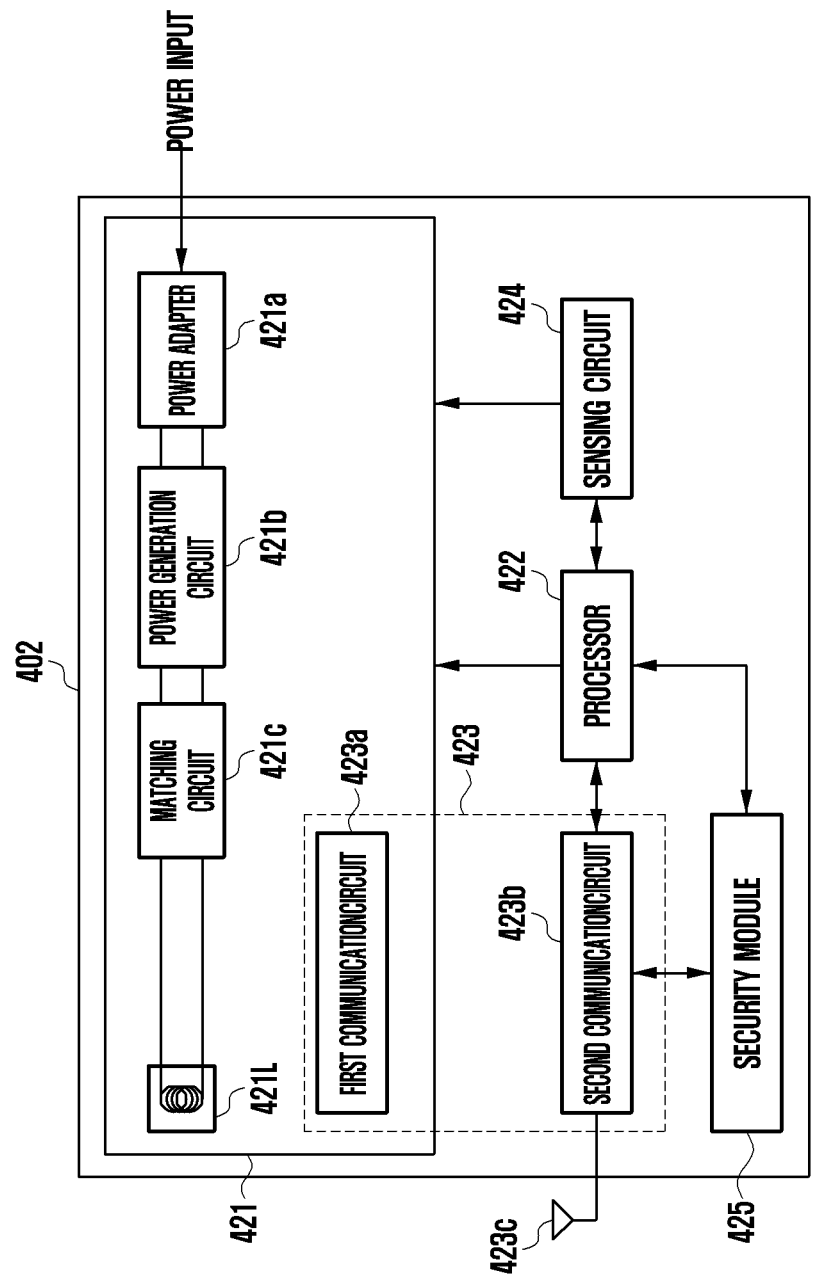
FIG. 4B is a schematic block diagram illustrating a second electronic device according to certain embodiments.

FIG. 1 describes an electronic device 101, which is powered by a battery. FIG. 2 describes the battery. The battery can be wirelessly charged using magnetic induction/resonance. FIG. 3 antenna modules that can be used for magnetic induction/resonance. FIGS. 4A and 4B describe wireless charger and a chargeable device, respectively.

FIGS. 5-13 describe communications between a wireless charger and a chargeable device. Generally speaking, the wireless charger detects the chargeable device using an antenna coil. In response to detecting the chargeable device, the wireless charger transmits data to the chargeable device, using a different antenna. After receiving a response, the wireless charger and the chargeable device perform various steps, such as authentication procedures, and establishing public key encryption. The wireless charger then wirelessly charges the chargeable device based on service information received from the chargeable device.

Figure 14:
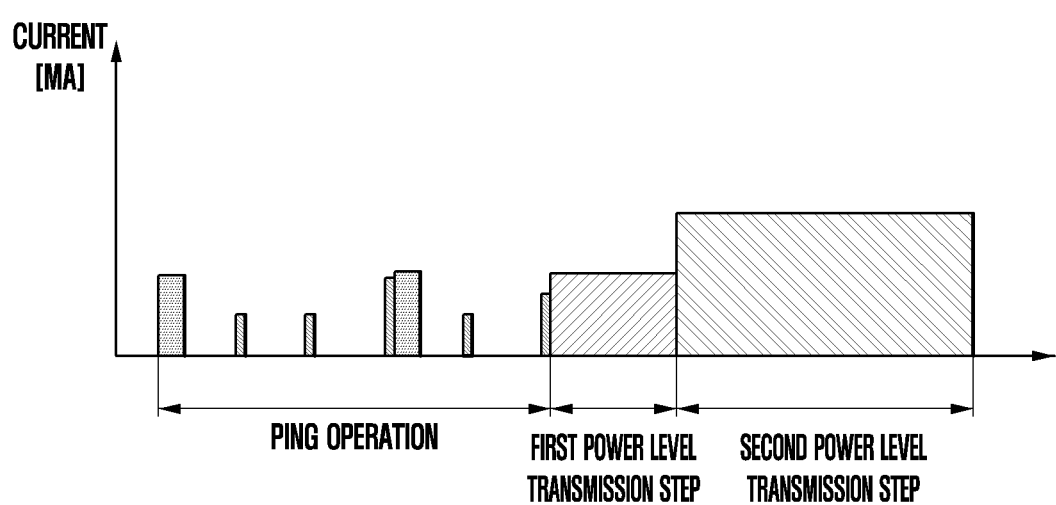
FIG. 14 is a diagram illustrating a graph relating to power transmission of the second electronic device according to certain embodiments.
Figure 15:
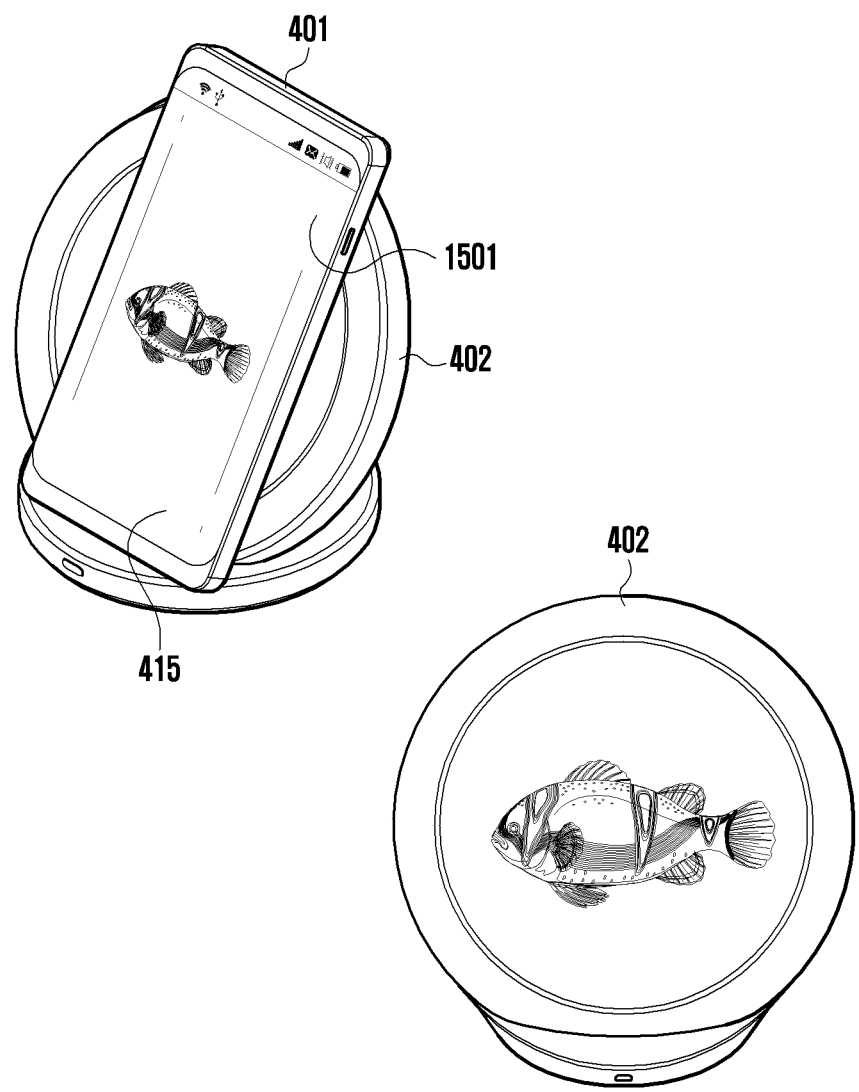
FIG. 15 is a diagram illustrating the first electronic device and the second electronic device according to certain embodiments.

FIG. 14 is a graph illustrating the current levels as a function of time. FIG. 15 discloses a first electronic device and a second electronic device.

Electronic Device

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101.

The electronic device 101 is powered, either by connection to a power source (power outlet), or by battery 189. The battery 189 allows the electronic device 101 to be mobile. However the battery 189 may store only a limited amount of power which may power the electronic device 101 for a limited amount of time. The battery may be recharged after the power is consumed, thereby again storing the limited amount of power.

Battery

FIG. 2 is a block diagram 200 illustrating the power management module 188 and the battery 189 according to certain embodiments. Referring to FIG. 2, the power management module 188 may include charging circuitry 210, a power adjuster 220, or a power gauge 230. The charging circuitry 210 may charge the battery 189 by using power supplied from an external power source outside the electronic device 101. According to an embodiment, the charging circuitry 210 may select a charging scheme (e.g., normal charging or quick charging) based at least in part on a type of the external power source (e.g., a power outlet, a USB, or wireless charging), magnitude of power suppliable from the external power source (e.g., about 20 Watt or more), or an attribute of the battery 189, and may charge the battery 189 using the selected charging scheme. The external power source may be connected with the electronic device 101, for example, directly via the connecting terminal 178 or wirelessly via the antenna module 197.

The power adjuster 220 may generate a plurality of powers having different voltage levels or different current levels by adjusting a voltage level or a current level of the power supplied from the external power source or the battery 189. The power adjuster 220 may adjust the voltage level or the current level of the power supplied from the external power source or the battery 189 into a different voltage level or current level appropriate for each of some of the components included in the electronic device 101. According to an embodiment, the power adjuster 220 may be implemented in the form of a low drop out (LDO) regulator or a switching regulator. The power gauge 230 may measure use state information about the battery 189 (e.g., a capacity, a number of times of charging or discharging, a voltage, or a temperature of the battery 189).

The power management module 188 may determine, using, for example, the charging circuitry 210, the power adjuster 220, or the power gauge 230, charging state information (e.g., lifetime, over voltage, low voltage, over current, over charge, over discharge, overheat, short, or swelling) related to the charging of the battery 189 based at least in part on the measured use state information about the battery 189. The power management module 188 may determine whether the state of the battery 189 is normal or abnormal based at least in part on the determined charging state information. If the state of the battery 189 is determined to abnormal, the power management module 188 may adjust the charging of the battery 189 (e.g., reduce the charging current or voltage, or stop the charging). According to an embodiment, at least some of the functions of the power management module 188 may be performed by an external control device (e.g., the processor 120).

The battery 189, according to an embodiment, may include a protection circuit module (PCM) 240. The PCM 240 may perform one or more of various functions (e.g., a pre-cutoff function) to prevent a performance deterioration of, or a damage to, the battery 189. The PCM 240, additionally or alternatively, may be configured as at least part of a battery management system (BMS) capable of performing various functions including cell balancing, measurement of battery capacity, count of a number of charging or discharging, measurement of temperature, or measurement of voltage.

According to an embodiment, at least part of the charging state information or use state information regarding the battery 189 may be measured using a corresponding sensor (e.g., a temperature sensor) of the sensor module 176, the power gauge 230, or the power management module 188. According to an embodiment, the corresponding sensor (e.g., a temperature sensor) of the sensor module 176 may be included as part of the PCM 240, or may be disposed near the battery 189 as a separate device.

The battery 189 may be wirelessly charged. Wireless charging or contactless charging may use technology in which the battery 189 is charged by wireless transmission of power from a wireless charger to a chargeable device without a connection between the chargeable device and the wireless charger by a separate connector. The technology may include a magnetic induction scheme and a magnetic resonance scheme using the antenna module 197.

Magnetic Induction and Magnetic Resonance

The power management module 188 can use an MST Antenna 397-1, an NFC Antenna 397-2, or another antenna 397-3. The MST Antenna 397-1 is generally used when a magnetic card is swiped. The NFC Antenna 397-2 can receive a signal transmitted from another electronic device. Antennas 397-1, 397-2, and 397-3 convert a voltage signal to a magnetic field, and vice versa.

FIG. 3 is a block diagram 300 illustrating the wireless communication module 192, the power management module 188, and the antenna module 197 of the electronic device 101 according to certain embodiments. Referring to FIG. 3, the wireless communication module 192 may include a magnetic secure transmission (MST) communication module 310 or a near-field communication (NFC) module 330, and the power management module 188 may include a wireless charging module 350. In such a case, the antenna module 197 may include a plurality of antennas that include a MST antenna 397-1 connected with the MST communication module 310, a NFC antenna 397-3 connected with the NFC communication module 330, and a wireless charging antenna 397-5 connected with the wireless charging module 350. For ease of description, the same components as those described in regard to FIG. 1 are briefly described or omitted from the description.

The MST communication module 310 may receive a signal containing control information or payment information such as card information from the processor 120, generate a magnetic signal corresponding to the received signal, and then transfer the generated magnetic signal to the external electronic device 102 (e.g., a point-of-sale (POS) device) via the MST antenna 397-1. To generate the magnetic signal, according to an embodiment, the MST communication module 310 may include a switching module (not shown) that includes one or more switches connected with the MST antenna 397-1, and control the switching module to change the direction of voltage or current supplied to the MST antenna 397-1 according to the received signal. The change of the direction of the voltage or current allows the direction of the magnetic signal (e.g., a magnetic field) emitted from the MST antenna 397-1 to change accordingly. If detected at the external electronic device 102, the magnetic signal with its direction changing may cause an effect (e.g., a waveform) similar to that of a magnetic field that is generated when a magnetic card corresponding to the card information associated with the received signal is swiped through a card reader of the electronic device 102.

According to an embodiment, for example, payment-related information and a control signal that are received by the electronic device 102 in the form of the magnetic signal may be further transmitted to an external server 108 (e.g., a payment server) via the network 199.

The NFC communication module 330 may obtain a signal containing control information or payment information such as card information from the processor 120 and transmit the obtained signal to the external electronic device 102 via the NFC antenna 397-2. According to an embodiment, the NFC communication module 330 may receive such a signal transmitted from the external electronic device 102 via the NFC antenna 397-2.

The wireless charging module 350 may wirelessly transmit power to the external electronic device 102 (e.g., a cellular phone or wearable device) via the wireless charging antenna 397-3, or wirelessly receive power from the external electronic device 102 (e.g., a wireless charging device). The wireless charging module 350 may support one or more of various wireless charging schemes including, for example, a magnetic resonance scheme or a magnetic induction scheme.

According to an embodiment, some of the MST antenna 397-1, the NFC antenna 397-2, or the wireless charging antenna 397-3 may share at least part of their radiators. For example, the radiator of the MST antenna 397-1 may be used as the radiator of the NFC antenna 397-2 or the wireless charging antenna 397-3, or vice versa. In such a case, the antenna module 197 may include a switching circuit (not shown) adapted to selectively connect (e.g., close) or disconnect (e.g. open) at least part of the antennas 397-1, 397-2, 397-3 for example, under the control of the wireless communication module 192 (e.g., the MST communication module 310 or the NFC communication module 330) or the power management module (e.g., the wireless charging module 350). For example, when the electronic device 101 uses a wireless charging function, the NFC communication module 330 or the wireless charging module 350 may control the switching circuit to temporarily disconnect at least one portion of the radiators shared by the NFC antenna 397-2 and the wireless charging antenna 397-3 from the NFC antenna 397-2 and to connect the at least one portion of the radiators with the wireless charging antenna 397-3.

According to an embodiment, at least one function of the MST communication module 310, the NFC communication module 330, or the wireless charging module 350 may be controlled by an external processor (e.g., the processor 120). According to an embodiment, at least one specified function (e.g., a payment function) of the MST communication module 310 or the NFC communication module 330 may be performed in a trusted execution environment (TEE). According to an embodiment, the TEE may form an execution environment in which, for example, at least some designated area of the memory 130 is allocated to be used for performing a function (e.g., a financial transaction or personal information-related function) that requires a relatively high level of security. In such a case, access to the at least some designated area of the memory 130 may be restrictively permitted, for example, according to an entity accessing thereto or an application being executed in the TEE.

The wireless communication module 192, power management module 188, and antenna module 197 can be used by a wireless charger and a chargeable device to conduct magnetic induction and magnetic resonance.

Wireless Charger and Chargeable Device

FIG. 4A is a schematic block diagram illustrating a first electronic device 401 according to certain embodiments. The first electronic device 401 can correspond to the first electronic device 101 of FIG. 1

FIG. 4B is a schematic block diagram illustrating a second electronic device 402 according to certain embodiments. The second electronic device 401 can correspond to the second electronic device 102 of FIG. 1

The second electronic device 402 may wirelessly charge the first electronic device 401 using antenna coil 421L to transmit power to antenna coil 411L. The second electronic device 402 and the first electronic device 401 can also conduct communication between each other using the antenna coils 411L, 421L (in-band communication) as well other antennas 413c and antennas 423c (out-of-band communication).

According to certain embodiments, referring to FIG. 4A and FIG. 4B, the second electronic device 402 (hereinafter, also referred to as a wireless charger) may wirelessly supply power to the first electronic device 401 (hereinafter, also referred to as a chargeable device), and the first electronic device 401 may wirelessly receive power. Roles of the first electronic device 401 and the second electronic device 402 in a wireless charging function are not limited to FIG. 4A and FIG. 4B, and may be applied even in an opposite case. For example, the second electronic device 402 (e.g., a smart phone) may serve as a chargeable device, and the first electronic device 401 (e.g., a smart phone) may serve as a wireless charger.

According to various embodiments, the first electronic device 401 includes a power reception circuit 411, a processor 412 (e.g., the processor 120 of FIG. 1), and a communication circuit 413 (e.g., the communication module 190 of FIG. 1), at least one sensor 414 (e.g., the sensor module 176 of FIG. 1), a display 415 (e.g., the display device 160 of FIG. 1), and/or a sensing circuit 416. Description of elements of the first electronic device 401, which correspond to elements of the second electronic device 402, may be partially omitted.

According to certain embodiments, the power reception circuit 411 may include a reception coil 411L that wirelessly receives power from the wireless charger 401, a matching circuit 411a, a rectification circuit 411b that rectifies received AC power to DC power, a control circuit 411c that adjusts a charging voltage, a switch circuit 411d, and/or a battery 411e (e.g., the battery 189 of FIG. 1). For example, the power reception circuit 411 may be included in a reception circuit (receiver integrated circuit (RxIC)).

According to certain embodiments, the communication circuit 413 may include at least one of a first communication circuit 413a and a second communication circuit 413b. The first communication circuit 413a may communicate with the second electronic device 402 via the reception coil 411L. The second communication circuit 413b may communicate with the second electronic device 402 by using any one of various short-range communication schemes, such as Bluetooth, Bluetooth low energy (BLE), Wi-Fi, Wi-Fi direct, and near field communication (NFC). The second communication circuit 413b may include an antenna 413c enabling communication with an external electronic device (e.g., the first electronic device 401 (e.g., the electronic device 101 of FIG. 1)). For example, the communication circuit 413 may be included in a reception circuit (receiver integrated circuit (RxIC)).

According to certain embodiments, the first communication circuit 413a may communicate with a first communication circuit 423a of the second electronic device 402 by using, for example, a frequency band that is equal to or close to a power signal frequency in the coil 411L (e.g., in-band scheme). In certain embodiments, for example, the first communication circuit 413a of the first electronic device 401 may communicate with the first communication circuit 423a of the second electronic device 402 in an in-band manner. The first communication circuit 413a of the first electronic device 401 may communicate with the second electronic device 402 by using a reception coil 411L for receiving power from the second electronic device 402 (the electronic device 102 of FIG. 1). The first electronic device 401 and the second electronic device 402 may communicate using coils 411L and 421L for power transmission or reception.

According to certain embodiments, if the first electronic device 401 receives a signal or power transmitted from the second electronic device 402 via the coil 411L, the first electronic device 401 may control the communication circuit 413 to generate power information or device information of the first electronic device 401 (e.g., the electronic device 101 of FIG. 1), which is to be transmitted to the second electronic device 402. The generated power information may be transmitted to the second electronic device 402 through the coil 411L. Alternatively, the generated power information may be transmitted to the second electronic device 402 via a separate antenna. For example, the power information may be information (e.g., received power, voltage, or a current state) related to charging power of the first electronic device 401, or may include output power, output voltage information, or charging current information of the second electronic device 402 or information related thereto. For example, the power information may include information for requesting a change in transmission power of the second electronic device 402 (the electronic device 102 of FIG. 1).

According to certain embodiments, the first electronic device 401 may charge the battery 411e via a charging circuit (e.g., the charging circuit 210 of FIG. 2) by using power received from a power transmission circuit 402 via a power reception circuit 411. When a magnetic field is formed in a coil 421L (e.g., a transmission coil (Tx coil)) of the second electronic device 402, a current flows through the coil 411L (e.g., a reception coil (Rx coil)) of the first electronic device 401 by electromagnetic induction or resonance, and the battery 411e may be charged, using the current, via the charging circuit.

According to certain embodiments, the sensing circuit 416 may sense that the first electronic device 401 is detached from a wireless charger 402. For example, the sensing circuit 416 may include at least one of a hardware detachment sensing circuit or a software detachment sensing algorithm. For example, the first electronic device 401 may perform an update on a detachment sensing function via software update and use the sensing circuit 416, even if a detachment sensing circuit is not included at the time of manufacture.

According to certain embodiments, the sensing circuit 416 may sense the second electronic device 402 by sensing received power or a search signal from the second electronic device 402. The sensing circuit 416 may detect a change in a signal at an input/output terminal of the coil 411L, the matching circuit 411a, or the rectification circuit 411b by a coil 411L signal generated by a signal output from the second electronic device 402. The sensing circuit 416 may obtain information relating to motion of the first electronic device 401. The sensing circuit 416 may obtain information relating to temperature from at least one sensor 414 (e.g., a temperature sensor, a heart rate monitor (HRM) sensor, etc.).

For example, the sensing circuit 416 may be included in the reception circuit (receiver integrated circuit (RxIC)).

According to certain embodiments, the display 415 may display various types of display information necessary for wireless power transmission or reception.

According to certain embodiments, the at least one sensor 414 may include at least some of a current/voltage sensor, a temperature sensor, an illuminance sensor, or a sound sensor. The temperature sensor may measure temperature of the battery 411e.

According to certain embodiments, the processor 412 may determine a charging control on the basis of a change in the temperature of the battery 411e or the inside of the first electronic device 401, which is measured by the temperature sensor over time.

According to certain embodiments, the processor 412 may perform overall control of the first electronic device 401, may generate various messages required for wireless power transmission, and may transfer the generated messages to the communication circuit 413.

According to certain embodiments, the processor 412 may charge the battery 411e via the charging circuit (e.g., the charging circuit 210 of FIG. 2) by using power received via the power reception circuit 411 from the second electronic device 402. The processor 412 may check context information related to charging the battery 411e while charging the battery 411e. For example, the context information related to charging the battery 411e may include at least one of information related to a fully-charged state of the battery 411e based on the capacity of the battery 411e, information on whether the battery 411e is abnormal, e.g., a swelling state, or a heating state of the first electronic device 401.

According to certain embodiments, the processor 412 may transmit, to the second electronic device 402, a signal corresponding to stopping of power output, so as to cause the second electronic device 402 to stop outputting power wirelessly, at least on the basis of the context information related to charging the battery 411e. For example, if it is determined that a state is at least one of a fully-charged state or a state of a designated temperature or higher for the first electronic device 401, the processor 412 may perform control to transmit, to the second electronic device 402, the signal corresponding to stopping of power output, so as to cause the second electronic device 402 to stop outputting power wirelessly.

According to certain embodiments, the processor 412 may control the power reception circuit 411 so as to prevent the second electronic device 402 from receiving wirelessly output power, or may control at least some of internal elements (e.g., the communication circuit 413, the power reception circuit 411, etc.) of the first electronic device 401 so as not to respond to the signal received from the second electronic device 402 (the electronic device 102 of FIG. 1). For example, the processor 412 may be included in a reception circuit (receiver integrated circuit, RxIC).

According to certain embodiments, the processor 412 may determine whether at least one of a signal for resuming charging in a state where the second electronic device 402 has stopped outputting power, or a signal related to a detachment state of the second electronic device 402 (e.g., the electronic device 102 of FIG. 1) is sensed. For example, if the remaining amount of the battery 411e, which is measured after a predetermined time elapses in a state where the battery 411e is fully charged, is less than a predefined value, or if temperature of the battery 411e is lower than a predefined value, the processor 412 may determine that a signal for resuming charging is sensed. However, the determination is not limited thereto.

According to certain embodiments, in the state where the second electronic device 402 has stopped outputting power, the processor 412 may determine whether it is possible to be located close to the second electronic device 402 so as to receive power therefrom (e.g., receiving a signal (e.g., ping) related to the detachment state), may check a charging resumption condition for the battery 411e, and may perform control to charge the battery 411e via the charging circuit 210 if the charging resumption condition is satisfied (e.g., if the remaining amount of the battery 411e, which is measured after the predetermined time elapses is less than the predefined value, or if the temperature of the battery 411e is lower than the predefined value).

According to certain embodiments, on the basis of at least one of the signal for resuming charging of the battery 411e or the signal related to the detachment state of the first electronic device 401 from the second electronic device 402 (the electronic device 102 of FIG. 1), the processor 412 may transmit, to the second electronic device 402 (the electronic device 102 of FIG. 1), a signal corresponding to the resumption of power output so as to cause the second electronic device 402 to output power wirelessly. In an embodiment, in response to transmitting the signal corresponding to the resumption of power output, the processor 412 may receive power transmitted from the second electronic device 402 (the electronic device 102 of FIG. 1).

According to certain embodiments, on the basis of at least one of the signal for resuming charging of the battery 411e or the signal related to whether the first electronic device 401 is detached from the second electronic device 402, the processor 412 may perform control to respond to the power or signal of the second electronic device 402 so as to cause the second electronic device 402 to resume outputting of power wirelessly.

According to certain embodiments, when detachment of the second electronic device 402 is sensed by the sensing circuit 416, the processor 412 may receive a signal for a state of the sensing circuit 416 from the power reception circuit 421. For example, the signal for the state of the sensing circuit 416 may include a signal in which the state of the sensing circuit 416 is switched from a low state (e.g., an attached state) to a high state (e.g., a state in which the first electronic device 401 is detached from the second electronic device 402).

According to certain embodiments, the processor 412 may transmit, to the power reception circuit 411, a signal corresponding to deactivation of the power reception circuit 411, at least on the basis of the context information related to charging of the battery 411e. Alternatively, the deactivation of the power reception circuit 411 may include performing control to prevent a response signal from being transmitted to the second electronic device 402, wherein the response signal is a signal responding to an identification signal for identification of the first electronic device 401, which is received from the second electronic device 402.

According to certain embodiments, the processor 412 may transmit, to the power reception circuit 411, a signal corresponding to activation of the power reception circuit 411, at least on the basis of the signal for resuming charging of the battery 411e or the signal related to the detachment state of the second electronic device 402. Alternatively, the activation of the power reception circuit 411 may include transmitting, to the second electronic device 402, a response signal for a power signal received from the second electronic device 402.

According to certain embodiments, the second electronic device 402 may include a power transmission circuit 421, a processor 422, a communication circuit 423, a sensing circuit 424, and/or a security module 425.

According to certain embodiments, the power transmission circuit 421 may include a power adapter 421a that receives power input from outside and appropriately converts a voltage of the input power, a power generation circuit 421b that generates power, and/or a matching circuit 421c that maximizes efficiency between a transmission coil 421L and a reception coil 411L.

According to certain embodiments, the power transmission circuit 421 may include multiple number of at least some of the power adapter 421a, the power generation circuit 421b, the transmission coil 421L, or the matching circuit 421c, so as to enable power transmission to multiple chargeable devices.

According to certain embodiments, the power transmission circuit 421 may generate a first signal of a first frequency for providing first power to a first external electronic device and a second signal of a second frequency for providing second power to a second external electronic device, by using the power generation circuit 421b.

According to certain embodiments, the processor 422 may perform overall control of the second electronic device 402 (the electronic device 102 of FIG. 1), may generate various messages required for wireless power transmission, and may transfer the generated messages to the communication circuit 423.

According to certain embodiments, the processor 422 may calculate power (or amount of power) to be transmitted to the first electronic device 401 (electronic device 101 of FIG. 1) on the basis of information received from the communication circuit 423.

According to certain embodiments, the processor 422 may control the power transmission circuit 421 so that the power calculated by the transmission coil 421L is transmitted to the first electronic device 401.

According to certain embodiments, when power is transmitted to each of multiple chargeable devices, the processor 422 may control the power generation circuit 421b to generate the first signal of the first frequency for providing the first power to the first external electronic device and the second signal of the second frequency for providing the second power to the second external electronic device.

According to certain embodiments, the communication circuit 423 may include at least one of a first communication circuit 423a and a second communication circuit 423b. The first communication circuit 423a may communicate with the first communication circuit 413a of the first electronic device 401 by using, for example, a frequency band that is equal to or close to a frequency used for transferring power in the transmission coil 421L (e.g., in-band scheme). The first communication circuit 413a may perform communication using, for example, the transmission coil 421L for transferring power generated by the power generation circuit 421b to the first electronic device 401.

According to certain embodiments, the first communication circuit 423a of the second electronic device 402 and the first communication circuit 413a of the first electronic device 401 may communicate in an in-band scheme. The first communication circuit 423a of the second electronic device 402 may communicate with the first electronic device 401 by using the transmission coil 421L for transferring power to the first electronic device 401. The first communication circuit 413a of the first electronic device 401 may communicate with the second electronic device 402 by using a reception coil 411L for receiving power from the second electronic device 402. The first electronic device 401 and the second electronic device 402 may communicate using coils 411L and 421L for power transmission or reception.

According to certain embodiments, the second communication circuit 423b may communicate with the second communication circuit 413b of the first electronic device 401 by using, for example, a frequency band that is different from the frequency used for transferring power in the transmission coil 421L (e.g., in-band scheme). For example, the second communication circuit 423b may use any one of various short-range communication schemes, such as Bluetooth, Bluetooth low energy (BLE), Wi-Fi, Wi-Fi direct, and near field communication (NFC). The second communication circuit 413b may include an antenna 413c enabling communication with an external electronic device (e.g., the first electronic device 401). The processor 422 may obtain information related to a charging state (e.g., Vrec information, Iout information, various packets, messages, etc.) from the communication circuits 423, 423a, or 423b. The processor 422 may adjust power supplied to the first electronic device 401 on the basis of the information related to the charging state.

According to certain embodiments, when a security module 425 transmits data via the second communication circuit 423b, the security module 425 enables the data to be encrypted.

According to certain embodiments, when the security module 425 transmits data via the second communication circuit 423b, the security module 425 may be utilized for data encryption.

According to certain embodiments, the security module 425 may be connected to the processor 422 and/or the second communication circuit 423b so as to transmit or receive data. The security module 425 may perform an authentication procedure or may use data stored in the security module 425 while transmitting data to or receiving data from the processor 422 and/or the second communication circuit 423b.

According to certain embodiments, the security module 425 may be included in the processor 422 so as to be implemented as an integrated circuit.

According to certain embodiments, the processor 422 enables data to be encrypted when the data is transmitted via the second communication circuit 423b. According to certain embodiments, the processor 422 may be connected to the second communication circuit 423b so as to transmit or receive data. The processor 422 may perform an authentication procedure or may use data stored in the security module 425 while transmitting data to or receiving data from the second communication circuit 423b. The second electronic device 402 may further include a policy manager (not shown) related to a charging policy or a communication method of the second communication circuit 423b.

In certain embodiments, a policy manager may check a power state (e.g., voltage, current, and power) of the first electronic device 401 communicatively connected via the first communication circuit 423a or the second communication circuit 423b, and may change a power state for charging when authentication of the first electronic device 401 is completed.

In certain embodiments, the processor 422 may check a power state (e.g., voltage, current, and power) of the first electronic device 401 communicatively connected via the first communication circuit 423a or the second communication circuit 423b, and may change the power state for charging when authentication of the first electronic device 401 is completed.

According to certain embodiments, the sensing circuit 424 may include at least one sensor, and at least one state of the second electronic device 402 may be sensed using the at least one sensor.

According to certain embodiments, the sensing circuit 424 may include at least one of a temperature sensor, a motion sensor, or a current (or voltage) sensor, wherein a temperature state of the second electronic device 402 may be sensed using a temperature sensor, a motion state of the second electronic device 402 may be sensed using a motion sensor, and a state of an output signal of the second electronic device 402 (the electronic device 102 of FIG. 1), for example, a magnitude of current, a magnitude of voltage, or a magnitude of power, may be sensed using a current (or voltage) sensor.

According to certain embodiments, the current (or voltage) sensor may measure a signal in the power transmission circuit 421. A signal may be measured in at least a partial area of the power generation circuit 421b or the coil 421L matching circuit 421c. For example, the current (or voltage) sensor may include a circuit that measures a signal at the front end of the coil 421L.

According to certain embodiments, the sensing circuit 424 may be a circuit for foreign object detection (FOD).

According to certain embodiments, the processor 422 may transmit power for charging the battery 411e to the first electronic device 401 (e.g., the electronic device 101 of FIG. 1).

According to certain embodiments, at least on the basis of the context information related to charging of the battery 411e, the processor 422 may stop outputting power if a signal corresponding to stopping of power output is received from the first electronic device 401 so as to stop outputting power wirelessly.

According to certain embodiments, the processor 422 may receive, from the first electronic device 401, a signal corresponding to resumption of power output so as to resume wirelessly outputting power. In response to reception of the signal corresponding to the resumption of power output, the processor 422 may wirelessly output power and transmit the power to the first electronic device 401.

When in-band communication occurs using a communication protocol associated with the wireless charging coils 411L and 421L, it is difficult to process promised authentication between a wireless charger 402 and chargeable device 401 due to limitations in data transmission amount and speed.

According to certain embodiments, a method performs an authentication operation using a communication protocol that is different from the communication protocol associated with the wireless charging coil. According to certain embodiments, an authentication operation may be performed using various communication protocols.

Figure 5:
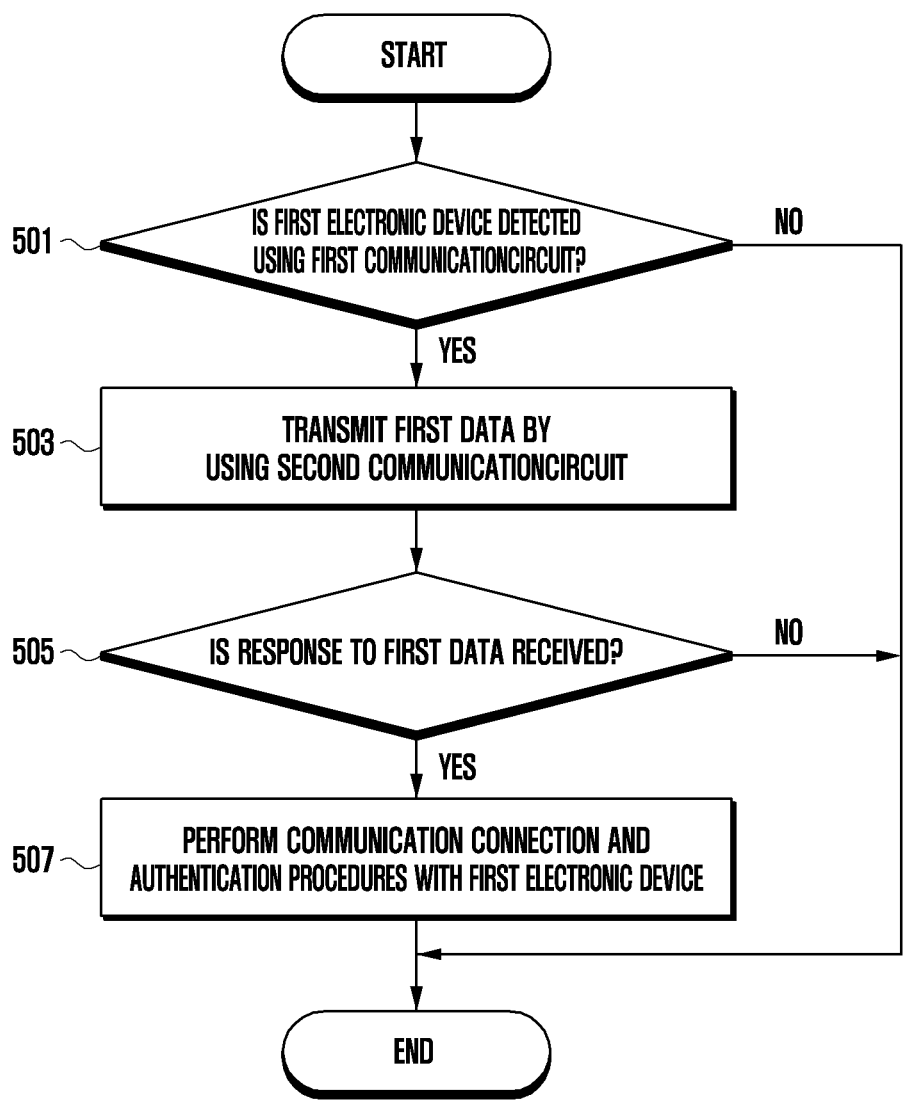
FIG. 5 is a flowchart relating to a method of authenticating a first electronic device by a second electronic device according to certain embodiments.

FIG. 5 is a flowchart relating to a method of authenticating the first electronic device 401 by the second electronic device 402 according to certain embodiments.

In certain embodiments, in operation 501, the second electronic device 402 may determine whether the first electronic device 401 is detected using the first communication circuit 423a, under the control of the processor 422.

In certain embodiments, the first electronic device 401 may be located on the second electronic device 402 (e.g., a charging pad area) so as to charge the battery 411e. The first electronic device 401 may be located close to the transmission coil 421L of the second electronic device 402.

In certain embodiments, the first communication circuit 423a of the second electronic device 402 and the first communication circuit 413a of the first electronic device 401 may communicate in an in-band scheme. The first communication circuit 423a of the second electronic device 402 may communicate with the first electronic device 401 by using the transmission coil 421L for transferring power to the first electronic device 401. The first communication circuit 413a of the first electronic device 401 may communicate with the second electronic device 402 by using a reception coil 411L for receiving power from the second electronic device 402. The first electronic device 401 and the second electronic device 402 may communicate using coils 411L and 421L for power transmission or reception.

In certain embodiments, the first electronic device 401 and the second electronic device 402 may exchange information required for wireless power transmission via in-band communication according to a wireless power consortium (WPC) standard. For example, in-band communication may be a scheme in which information can be exchanged between the first electronic device 401 and the second electronic device 402 via frequency or amplitude modulation of a wireless power transmission signal in a wireless power transmission situation between the coil 411L and the coil 421L. The information may be, for example, IDs (e.g., model names or identification information of the electronic devices) or charging operation mode information (e.g., information on transmitted/received power and voltage, information on rectification, and information for changing an operation mode) of the electronic devices 401 the 402.

In certain embodiments, in operation 501, the second electronic device 402 may exchange information and determine whether the first electronic device 401 is detected, by using the first communication circuit 423a under the control of the processor 422.

In certain embodiments, in operation 503, the second electronic device 402 may transmit first data by using the second communication circuit 423b under the control of the processor 422. In certain embodiments, in operation 503, the first data transmitted using the second communication circuit 423b may be data for discovery or advertisement for communication connection. For example, the first data transmitted using the second communication circuit 423b may be an advertising packet or scanning/discovery data. For example, if the first electronic device 401 has been already authenticated and the second electronic device 402 stores an address of the first electronic device 401, the first data transmitted using the second communication circuit 423b may be data transmitted based on address data for the first electronic device 401 or may be an advertising packet. For example, the second communication circuit 423b may use at least one of Bluetooth, low power Bluetooth, Wi-Fi, and Wi-Fi Direct. In certain embodiments, in operation 505, the second electronic device 402 may determine whether a response to the first data has been received from the first electronic device 401, under the control of the processor 422. In certain embodiments, in operation 505, the second electronic device 402 may proceed to operation 507 if the response to the first data is received from the first electronic device 401, under the control of the processor 422.

In certain embodiments, the first electronic device 401 may transmit the response to the first data, which is received from the second electronic device 402, under the control of the processor 412.

In certain embodiments, under the control of the processor 412, the first electronic device 401 may transmit the response to the first data, which is received from the second electronic device 402, while receiving power from the second electronic device 402.

In certain embodiments, if the response to the first data is received, the second electronic device 402 may perform communication connection and authentication procedures with the first electronic device 401, in operation 507 under the control of the processor 422.

In certain embodiments, in operation 507, the second electronic device 402 may perform authentication and communication connection with the first electronic device 401 by using a public key request operation and a public key response operation.

In certain embodiments, if the response to the first data is received, when the second electronic device 402 performs the communication connection and authentication procedures with the first electronic device 401 in operation 507 under the control of the processor 422, the second electronic device 402 may exchange encrypted information by using the security module 425.

In certain embodiments, if the response to the first data is received, when the second electronic device 402 performs the communication connection and authentication procedures with the first electronic device 401 in operation 507 under the control of the processor 422, the second electronic device 402 may exchange the encrypted information by using the processor 422. In certain embodiments, in operation 507, when performing the communication connection and authentication procedures with the first electronic device 401, the second electronic device 402 may receive an address (e.g., MAC address) required for the communication connection from the first electronic device 401.

For example, when the first data is sensed, the first electronic device 401 may transmit a response signal for the first data. The second electronic device 402 may receive a request signal for Bluetooth or low-power Bluetooth connection from the first electronic device 401, and the second electronic device 402 may emit a signal of the first communication circuit 423a for authentication. The second electronic device 402 may receive the request signal for communication connection via the second communication circuit 423b from the first electronic device 401, and the second electronic device 402 may emit the signal of the first communication circuit 423a for authentication.

In certain embodiments, in operation 507, when performing the communication connection and authentication procedures with the first electronic device 401, the second electronic device 402 may transmit ID information (identification) on the second electronic device 402 to the first electronic device 401 using the second communication circuit 423b. For example, the ID information on the second electronic device 402 is 4-byte data, and may be information on an accessory type and service information of the second electronic device 402.

Additionally, after completing the communication connection and authentication procedures with the first electronic device 401, the second electronic device 402 may transmit/receive advanced audio distribution profile (A2DP) information, headset profile (HSP) information, and/or handsfree profile (HFP) information to/from the first electronic device 401.

Figure 6:
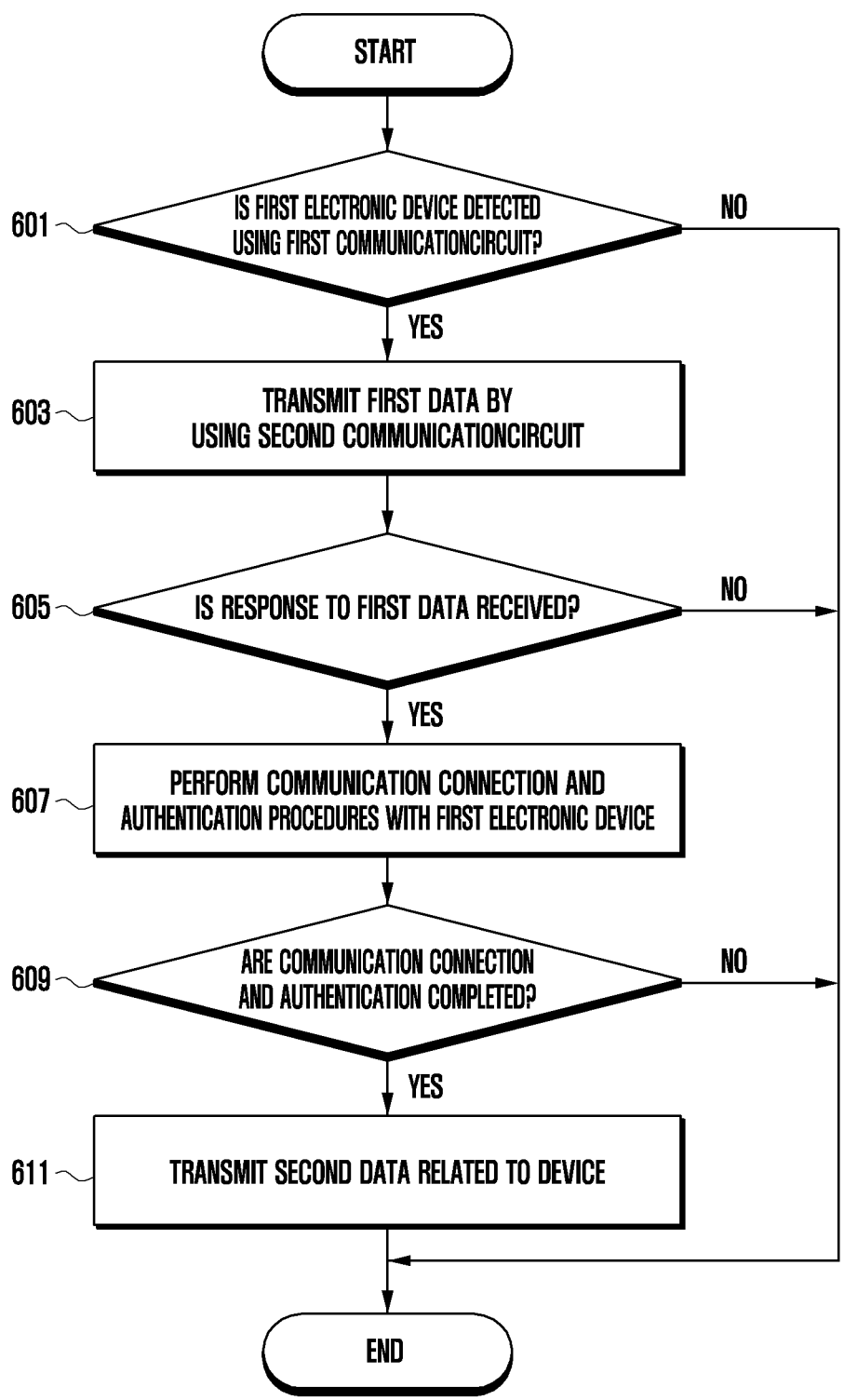
FIG. 6 is a flowchart relating to a service and a method of authenticating the first electronic device by the second electronic device according to certain embodiments.

FIG. 6 is a flowchart relating to a service and a method of authenticating the first electronic device 401 by the second electronic device 402 according to certain embodiments.

In certain embodiments, in operation 601, the second electronic device 402 may determine whether the first electronic device 401 is detected using the first communication circuit 423a, under the control of the processor 422.

In certain embodiments, the first electronic device 401 may be located on a charging area of the second electronic device 402 so as to charge the battery 411e. The first electronic device 401 may be located close to the transmission coil 421L or the charging pad of the second electronic device 402 so as to charge the battery 411e.

In certain embodiments, the first communication circuit 423a of the second electronic device 402 and the first communication circuit 413a of the first electronic device 401 may communicate in an inband scheme. The first communication circuit 423a of the second electronic device 402 may communicate with the first electronic device 401 by using the transmission coil 421L for transferring power to the first electronic device 401 (e.g., the electronic device 101 of FIG. 1). The first communication circuit 413a of the first electronic device 401 may communicate with the second electronic device 402 by using a reception coil 411L for receiving power from the second electronic device 402 (the electronic device 102 of FIG. 1). The first electronic device 401 and the second electronic device 402 may communicate using coils 411L and 421L for power transmission or reception.

In certain embodiments, the first electronic device 401 and the second electronic device 402 may exchange information required for wireless power transmission via inband communication according to a wireless power consortium (WPC) standard. For example, inband communication may be a scheme in which information can be exchanged between the first electronic device 401 and the second electronic device 402 via frequency or amplitude modulation of a wireless power transmission signal in a wireless power transmission situation between the coil 411L and the coil 421L. The information may be, for example, IDs (e.g., model names or identification information of the electronic devices) or charging operation mode information (e.g., information on transmitted/received power and voltage, information on rectification, and information for changing an operation mode) of the electronic devices 401 the 402.

In certain embodiments, in operation 601, the second electronic device 402 may exchange information and determine whether the first electronic device 401 is detected, by using the first communication circuit 423a under the control of the processor 422.

In certain embodiments, in operation 603, the second electronic device 402 may transmit first data by using the second communication circuit 423b under the control of the processor 422. In certain embodiments, in operation 603, the first data transmitted using the second communication circuit 423b may be data for discovery or advertisement for a communication connection. For example, the first data transmitted using the second communication circuit 423b may be an advertising packet or scanning/discovery data. For example, if the first electronic device 401 has been already authenticated and the second electronic device 402 stores an address of the first electronic device 401, the first data transmitted using the second communication circuit 423b may be data transmitted based on address data for the first electronic device 401 or may be an advertising packet. For example, the second communication circuit 423b may use at least one of Bluetooth, low power Bluetooth, Wi-Fi, and Wi-Fi Direct.

In certain embodiments, in operation 605, the second electronic device 402 may determine whether a response to the first data has been received from the first electronic device 401, under the control of the processor 422.

In certain embodiments, the first electronic device 401 may transmit the response to the first data, which is received from the second electronic device 402, under the control of the processor 412.

In certain embodiments, under the control of the processor 412, the first electronic device 401 may transmit the response to the first data, which is received from the second electronic device 402, while receiving power from the second electronic device 402.

In certain embodiments, in operation 605, the second electronic device 402 may proceed to operation 607 if the response to the first data is received from the first electronic device 401, under the control of the processor 422.

In certain embodiments, if the response to the first data is received, the second electronic device 402 may perform communication connection and authentication procedures with the first electronic device 401, in operation 607, under the control of the processor 422, using the second communication circuit 423b.

In certain embodiments, in operation 607, the second electronic device 402 may perform authentication and communication connection with the first electronic device 401 by using a public key request operation and a public key response operation.

In certain embodiments, if the response to the first data is received, when the second electronic device 402 performs the communication connection and authentication procedures with the first electronic device 401 in operation 607, under the control of the processor 422, the second electronic device 402 may exchange encrypted information by using the security module 425.

In certain embodiments, if the response to the first data is received, when the second electronic device 402 performs the communication connection and authentication procedures with the first electronic device 401 in operation 607 under the control of the processor 422, the second electronic device 402 may exchange encrypted information by using the processor 422.

In certain embodiments, in operation 607, when performing the communication connection and authentication procedures with the first electronic device 401, the second electronic device 402 may receive an address (e.g., MAC address) required for communication connection from the first electronic device 401.

For example, when the first data is sensed, the first electronic device 401 may transmit a response signal for the first data. The second electronic device 402 may receive a request signal for Bluetooth or low-power Bluetooth connection from the first electronic device 401, and the second electronic device 402 may emit a signal of the first communication circuit 423a for authentication. The second electronic device 402 may receive the request signal for communication connection via the second communication circuit 423b from the first electronic device 401, and the second electronic device 402 may emit the signal of the first communication circuit 423a for authentication.

In certain embodiments, in operation 607, when performing the communication connection and authentication procedures with the first electronic device 401, the second electronic device 402 may transmit ID information (identification) on the second electronic device 402 to the first electronic device 401. For example, the ID information on the second electronic device 402 is 4-byte data, and may be information on an accessory type and service information of the second electronic device 402.

In certain embodiments, the second electronic device 402 may determine, in operation 609, whether the communication connection and the authentication are completed, under the control of the processor 422.

In certain embodiments, the second electronic device 402 may proceed to operation 611 if it is determined, in operation 609, that the communication connection and the authentication are completed, under the control of the processor 422.

In certain embodiments, if the communication connection and the authentication are completed, the second electronic device 402 may transmit, using the second communication circuit 423b, second data related to a service to the first electronic device 401, in operation 611, under the control of the processor 422.

In certain embodiments, in operation 611, under the control of the processor 422, the second electronic device 402 may transmit/receive advanced audio distribution profile (A2DP) information, headset profile (HSP) information, and/or handsfree profile (HFP) information to/from the first electronic device 401.

In certain embodiments, if the communication connection and the authentication are completed, the second electronic device 402 may transmit/receive the second data related to the service to/from the first electronic device 401, in operation 611, under the control of the processor 422. For example, the service may include an update service, an audio transmission/reception service, and/or a content-related service of the second electronic device 402. The content-related service may include at least one of an address (e.g., uniform resource locator (URL)) for Internet access, a font, a background screen, or a skin. The service may be information related to a call, music playback, and content download. The content-related service may be information related to a call, music playback, and content download.

In certain embodiments, if the first electronic device 401 receives the second data related to the service from the second electronic device 402, the first electronic device 401 may receive service-related information by communication connection to an external electronic device (e.g., the electronic device 104 of FIG. 1) or a server (e.g., the server 108 of FIG. 1) via a communication module (e.g., the communication module 190 of FIG. 1) on the basis of the second data. If the first electronic device 401 receives the service-related information from the external electronic device (e.g., the electronic device 104 of FIG. 1) or the server (e.g., the server 108 of FIG. 1) via the communication module (e.g., the communication module 190 of FIG. 1), the first electronic device 401 may store the received information in a memory (e.g., the memory 130 of FIG. 1) or may display the received information on a display (e.g., the display device 160 of FIG. 1).

In certain embodiments, in operation 611, the second data related to the service of the second electronic device 402 may be information on an Internet address (e.g., URL) and a service ID associated with information on a content-related service, an audio transmission/reception service, and/or an update service of the second electronic device 402.

According to certain embodiments, in operation 611, the second electronic device 402 may encrypt the second data related to the service and may transmit, using the second communication circuit 423b, or receive the encrypted data, via the security module 425.

According to certain embodiments, in operation 611, the second electronic device 402 may encrypt the second data related to the service and may transmit or receive the encrypted data, via the processor 422.

Figure 7:
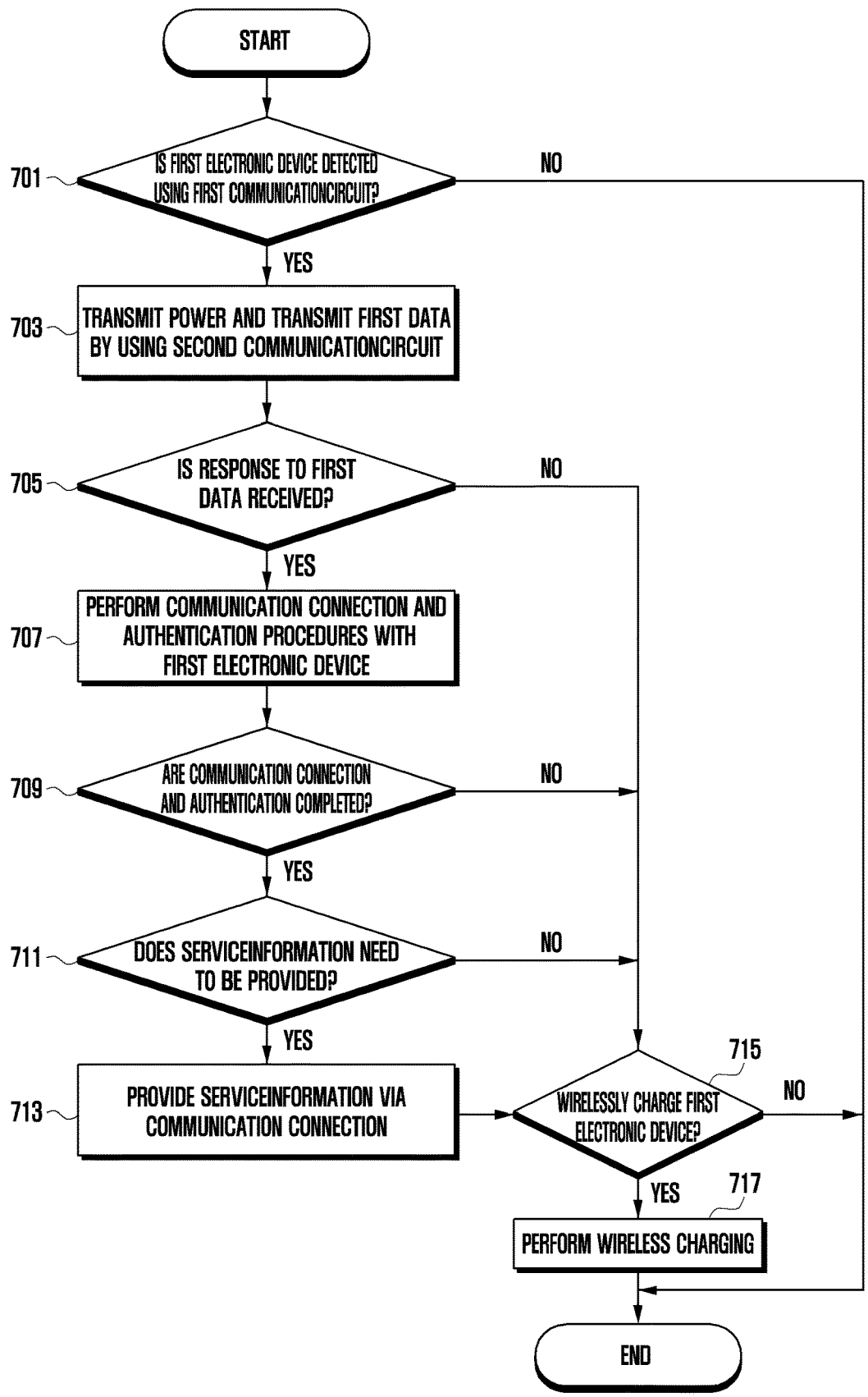
FIG. 7 is a flowchart relating to a service and a method of authenticating the first electronic device by the second electronic device according to certain embodiments.

FIG. 7 is a flowchart relating to a service and a method of authenticating the first electronic device 401 by the second electronic device 402 according to certain embodiments.

In certain embodiments, in operation 701, the second electronic device 402 may determine whether the first electronic device 401 is detected using the first communication circuit 423a, under the control of the processor 422.

In certain embodiments, if the first electronic device 401 is detected using the first communication circuit 423a, the second electronic device 402 may proceed to operation 703 under the control of the processor 422.

In certain embodiments, the first electronic device 401 may be located on the second electronic device 402 (e.g., a charging pad area) so as to charge the battery 411e. The first electronic device 401 may be located close to the transmission coil 421L of the second electronic device 402.

In certain embodiments, the first communication circuit 423a of the second electronic device 402 and the first communication circuit 413a of the first electronic device 401 may communicate in an inband scheme. The first communication circuit 423a of the second electronic device 402 may communicate with the first electronic device 401 by using the transmission coil 421L for transferring power to the first electronic device 401 (e.g., the electronic device 101 of FIG. 1). The first communication circuit 413a of the first electronic device 401 may communicate with the second electronic device 402 by using a reception coil 411L for receiving power from the second electronic device 402 (the electronic device 102 of FIG. 1). The first electronic device 401 and the second electronic device 402 may communicate using coils 411L and 421L for power transmission or reception.

In certain embodiments, the first electronic device 401 and the second electronic device 402 may exchange information required for wireless power transmission via inband communication according to a wireless power consortium (WPC) standard. For example, inband communication may be a scheme in which information can be exchanged between the first electronic device 401 and the second electronic device 402 via frequency or amplitude modulation of a wireless power transmission signal in a wireless power transmission situation between the coil 411L and the coil 421L. The information may be, for example, IDs (e.g., model names or identification information of the electronic devices) or charging operation mode information (e.g., information on transmitted/received power and voltage, information on rectification, and information for changing an operation mode) of the electronic devices 401 the 402.

In certain embodiments, in operation 701, the second electronic device 402 may exchange information and determine whether the first electronic device 401 is detected, by using the first communication circuit 423a under the control of the processor 422.

In certain embodiments, if the first electronic device 401 is detected using the first communication circuit 423a in operation 701, the second electronic device 402 may transmit power to the first electronic device 401 via the coil 421L on the basis of a model name, identification information, or charging operation mode information of the first electronic device 401.

In certain embodiments, in operation 703, the second electronic device 402 may transmit power to the first electronic device 401 and may transmit first data by using the second communication circuit 423b, under the control of the processor 422. In certain embodiments, in operation 703, the first data transmitted using the second communication circuit 423b may be data for discovery or advertisement for a communication connection. For example, the first data transmitted using the second communication circuit 423b may be an advertising packet or scanning/discovery data. For example, if the first electronic device 401 has been already authenticated and the second electronic device 402 stores an address of the first electronic device 401, the first data transmitted using the second communication circuit 423b may be data transmitted based on address data for the first electronic device 401 or may be an advertising packet. For example, the second communication circuit 423b may use at least one of Bluetooth, low power Bluetooth, Wi-Fi, and Wi-Fi Direct.

In certain embodiments, in operation 705, the second electronic device 402 may determine whether a response to the first data has been received from the first electronic device 401, under the control of the processor 422.

In certain embodiments, the first electronic device 401 may transmit the response to the first data, which is received from the second electronic device 402, under the control of the processor 412.

In certain embodiments, under the control of the processor 412, the first electronic device 401 may transmit the response to the first data, which is received from the second electronic device 402, while receiving power from the second electronic device 402.

In certain embodiments, in operation 705, the second electronic device 402 may proceed to operation 707 if the response to the first data is received from the first electronic device 401, under the control of the processor 422.

In certain embodiments, in operation 705, the second electronic device 402 may proceed to operation 715 if no response to the first data is received from the first electronic device 401, under the control of the processor 422.

In certain embodiments, if the response to the first data is received, the second electronic device 402 may perform communication connection and authentication procedures with the first electronic device 401, in operation 707, under the control of the processor 422.

In certain embodiments, in operation 707, the second electronic device 402 may perform authentication and communication connection with the first electronic device 401 by using a public key request operation and a public key response operation.

In certain embodiments, if the response to the first data is received, when the second electronic device 402 performs the communication connection and authentication procedures with the first electronic device 401 in operation 707 under the control of the processor 422, the second electronic device 402 may exchange encrypted information by using the security module 425.

In certain embodiments, in operation 707, when performing the communication connection and authentication procedures with the first electronic device 401, the second electronic device 402 may receive an address (e.g., MAC address) required for communication connection from the first electronic device 401.

For example, when the first data is sensed, the first electronic device 401 may transmit a response signal for the first data. The second electronic device 402 may receive a request signal for Bluetooth or low-power Bluetooth connection from the first electronic device 401, and the second electronic device 402 may emit a signal of the first communication circuit 423a for authentication. The second electronic device 402 may receive the request signal for communication connection via the second communication circuit 423b from the first electronic device 401, and the second electronic device 402 may emit the signal of the first communication circuit 423a for authentication.

In certain embodiments, in operation 707, when performing the communication connection and authentication procedures with the first electronic device 401, the second electronic device 402 may transmit ID information (identification) on the second electronic device 402 to the first electronic device 401. For example, the ID information on the second electronic device 402 is 4-byte data, and may be information on an accessory type and service information of the second electronic device 402.

In certain embodiments, the second electronic device 402 may determine, in operation 709, whether the communication connection and the authentication are completed, under the control of the processor 422.

In certain embodiments, the second electronic device 402 may proceed to operation 711 if it is determined, in operation 709, that the communication connection and the authentication are completed, under the control of the processor 422.

In certain embodiments, the second electronic device 402 may proceed to operation 715, if it is determined, in operation 709, that the communication connection and the authentication fail, under the control of the processor 422.

In certain embodiments, the second electronic device 402 may determine, in operation 711, whether service information needs to be provided, under the control of the processor 422.

In certain embodiments, the determination on whether the service information needs to be provided, which is made by the second electronic device 402 in operation 711 under the control of the processor 422 may include, for example, determining whether the service information needs to be provided, via reception of service-related information from the first electronic device 401 or via transmission of the service-related information to the first electronic device 401.

In certain embodiments, the second electronic device 402 may proceed to operation 713 if it is determined, in operation 711, that the service information needs to be provided, under the control of the processor 422.

In certain embodiments, the second electronic device 402 may proceed to operation 715 if it is determined, in operation 711, that the service information does not need to be provided, under the control of the processor 422.

In certain embodiments, if it is determined that the service information needs to be provided, the second electronic device 402 may provide the service information via communication connection in operation 713 under the control of the processor 422.

In certain embodiments, if it is determined that the service information needs to be provided, the second electronic device 402 may transmit the second data related to the service to the first electronic device 401, in operation 713 under the control of the processor 422.

In certain embodiments, if it is determined that the service information needs to be provided, the second electronic device 402 may transmit/receive the second data related to the service to/from the first electronic device 401 in operation 713 under the control of the processor 422. For example, the service may include an update service, an audio transmission/reception service, and/or a content-related service of the second electronic device 402. The content-related service may include at least one of an address (e.g., uniform resource locator (URL)) for Internet access, a font, a background screen, or a skin. The service may be information related to a call, music playback, and content download. The content-related service may be information related to a call, music playback, and content download.

In certain embodiments, if the first electronic device 401 receives the second data related to the service from the second electronic device 402, the first electronic device 401 may receive service-related information by a communication connection to an external electronic device (e.g., the electronic device 104 of FIG. 1) or a server (e.g., the server 108 of FIG. 1) via a communication module (e.g., the communication module 190 of FIG. 1) on the basis of the second data. If the first electronic device 401 receives the service-related information from the external electronic device (e.g., the electronic device 104 of FIG. 1) or the server (e.g., the server 108 of FIG. 1) via the communication module (e.g., the communication module 190 of FIG. 1), the first electronic device 401 may store the received information in a memory (e.g., the memory 130 of FIG. 1) or may display the received information on a display (e.g., the display device 160 of FIG. 1).

In certain embodiments, the second electronic device 402 may proceed to operation 715 under the control of the processor 422 if the second data related to the service is transmitted to the first electronic device 401 in operation 713.

In certain embodiments, in operation 713, under the control of the processor 422, the second electronic device 402 may transmit/receive advanced audio distribution profile (A2DP) information, headset profile (HSP) information, and/or handsfree profile (HFP) information to/from the first electronic device 401.

According to certain embodiments, in operation 711, the second electronic device 402 may encrypt the second data related to the service and may transmit or receive the encrypted data, via the security module 425.

According to certain embodiments, in operation 711, the second electronic device 402 may encrypt the service information and provide the encrypted service information by communication connection, via the security module 425.

In certain embodiments, in operation 713, the second data related to the service of the second electronic device 402 may be information on an Internet address (e.g., URL) and a service ID associated with information on a content-related service, an audio transmission/reception service, and/or an update service of the second electronic device 402.

In certain embodiments, the second electronic device 402 may determine whether the first electronic device 401 is being wirelessly charged, in operation 715 under the control of the processor 422.

In certain embodiments, the second electronic device 402 may determine whether power is being transmitted to the first electronic device 401, in operation 715 under the control of the processor 422.

In certain embodiments, the second electronic device 402 may be disposed close to the second electronic device 402 so as to determine whether the first electronic device 401 is in a wireless charging state, on the basis of whether a control error packet (CEP) is received from the first electronic device 401.

In certain embodiments, the determination on whether the first electronic device 401 is in the wireless charging state, which is made by the second electronic device 402 in operation 715 under the control of the processor 422 may include, for example, determining whether the first electronic device 401 is detached from or attached to the second electronic device 402, via the first communication circuit 423*a*.

In certain embodiments, the second electronic device 402 may proceed to operation 717 if it is determined that the first electronic device 401 is being wirelessly charged, in operation 715 under the control of the processor 422.

In certain embodiments, in relation to the determination that the first electronic device 401 is being wirelessly charged, which is made by the second electronic device 402 in operation 715 under the control of the processor 422, the wireless charging state may be determined also in operations 703, 705, 707, 709, 711, and 713, and if the wireless charging state is determined, the first electronic device 401 may maintain the wireless charging state as shown in operation 717.

In certain embodiments, in operation 717, under the control of the processor 422, the second electronic device 402 may transmit power to the first electronic device 401 via the coil 421L on the basis of the model name, identification information, or charging operation mode information of the first electronic device 401.

In certain embodiments, operations 715 and 717 are illustrated to be branched from operations 705, 709, 711, and 713, but are not limited thereto. Further, in operation 701, information may be exchanged using the first communication circuit 423*a*, whether the first electronic device 401 is detected may be determined, and then operations 715 and 717 may be separately performed at specified time intervals.

In certain embodiments, operations 707 and 713 can be performed using the second communication circuit 423*b*.

Figure 8:
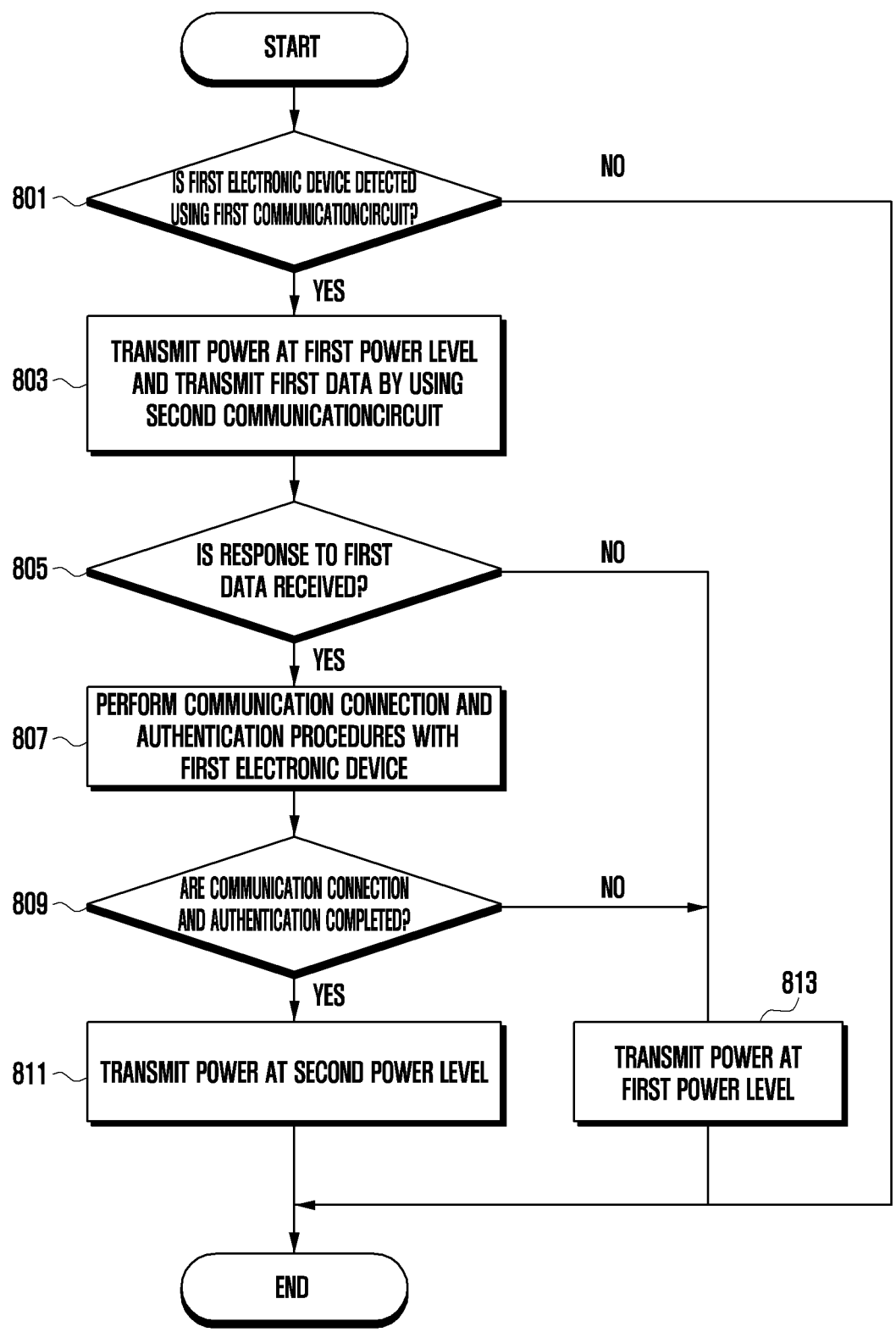
FIG. 8 is a flowchart relating to a method of authentication and power transmission for the first electronic device by the second electronic device according to certain embodiments.

FIG. 8 is a flowchart relating to a method of authentication and power transmission for the first electronic device 401 by the second electronic device 402 according to certain embodiments.

In certain embodiments, in operation 801, the second electronic device 402 may determine whether the first electronic device 401 is detected using the first communication circuit 423*a*, under the control of the processor 422.

In certain embodiments, the first electronic device 401 may be located on the second electronic device 402 (e.g., a charging pad area) so as to charge the battery 411*e*. The first electronic device 401 may be located close to the transmission coil 421L of the second electronic device 402.

In certain embodiments, the first communication circuit 423*a* of the second electronic device 402 and the first communication circuit 413*a* of the first electronic device 401 may communicate in an inband scheme. The first communication circuit 423*a* of the second electronic device 402 may communicate with the first electronic device 401 by using the transmission coil 421L for transferring power to the first electronic device 401 (e.g., the electronic device 101 of FIG. 1). The first communication circuit 413*a* of the first electronic device 401 may communicate with the second electronic device 402 by using a reception coil 411L for receiving power from the second electronic device 402 (the electronic device 102 of FIG. 1). The first electronic device 401 and the second electronic device 402 may communicate using coils 411L and 421L for power transmission or reception.

In certain embodiments, the first electronic device 401 and the second electronic device 402 may exchange information required for wireless power transmission via inband communication according to a wireless power consortium (WPC) standard. For example, inband communication may be a scheme in which information can be exchanged between the first electronic device 401 and the second electronic device 402 via frequency or amplitude modulation of a wireless power transmission signal in a wireless power transmission situation between the coil 411L and the coil 421L. The information may be, for example, IDs (e.g., model names or identification information of the electronic devices) or charging operation mode information (e.g., information on transmitted/received power and voltage, information on rectification, and information for changing an operation mode) of the electronic devices 401 the 402.

In certain embodiments, in operation 801, the second electronic device 402 may exchange information and determine whether the first electronic device 401 is detected, by using the first communication circuit 423a under the control of the processor 422.

In certain embodiments, in operation 803, the second electronic device 402 may transmit power of a first power level to the first electronic device 401 and may transmit first data by using the second communication circuit 423b, under the control of the processor 422. In certain embodiments, in operation 803, the first data transmitted using the second communication circuit 423b may be data for discovery or advertisement for communication connection. For example, the first data transmitted using the second communication circuit 423b may be an advertising packet or scanning/discovery data. For example, if the first electronic device 401 has been already authenticated and the second electronic device 402 stores an address of the first electronic device 401, the first data transmitted using the second communication circuit 423b may be data transmitted based on address data for the first electronic device 401 or may be an advertising packet. For example, the second communication circuit 423b may use at least one of Bluetooth, low power Bluetooth, Wi-Fi, and Wi-Fi Direct.

If IDs (e.g., the model name or identification information of the electronic device) or charging operation mode information (e.g., information on transmitted/received power and voltage and rectification, and information for changing an operation mode) of the electronic devices 401 and 402 is exchanged via the first communication circuit 423a, the second electronic device 402 may transmit, in operation 703, power to the first electronic device 401 in the first power level via the coil 421L on the basis of the model name, identification information, or charging operation mode information of the first electronic device 401.

In certain embodiments, in operation 805, the second electronic device 402 may determine whether a response to the first data has been received from the first electronic device 401, under the control of the processor 422.

In certain embodiments, in operation 805, the second electronic device 402 may proceed to operation 807 if the response to the first data is received from the first electronic device 401, under the control of the processor 422.

In certain embodiments, in operation 805, the second electronic device 402 may proceed to operation 813 if no response to the first data is received from the first electronic device 401, under the control of the processor 422.

In certain embodiments, the first electronic device 401 may transmit the response to the first data, which is received from the second electronic device 402, under the control of the processor 412.

In certain embodiments, under the control of the processor 412, the first electronic device 401 may transmit the response to the first data, which is received from the second electronic device 402, while receiving power from the second electronic device 402.

In certain embodiments, if the response to the first data is received, the second electronic device 402 may perform communication connection and authentication procedures with the first electronic device 401, in operation 807, under the control of the processor 422.

In certain embodiments, in operation 807, the second electronic device 402 may perform authentication and communication connection with the first electronic device 401 by using a public key request operation and a public key response operation.

In certain embodiments, if the response to the first data is received, when the second electronic device 402 performs the communication connection and authentication procedures with the first electronic device 401 in operation 807 under the control of the processor 422, the second electronic device 402 may exchange encrypted information by using the security module 425.

In certain embodiments, in operation 807, when performing the communication connection and authentication procedures with the first electronic device 401, the second electronic device 402 may receive an address (e.g., MAC address) required for communication connection from the first electronic device 401.

For example, when the first data is sensed, the first electronic device 401 may transmit a response signal for the first data. The second electronic device 402 may receive a request signal for Bluetooth or low-power Bluetooth connection from the first electronic device 401, and the second electronic device 402 may emit a signal of the first communication circuit 423a for authentication. The second electronic device 402 may receive the request signal for communication connection via the second communication circuit 423b from the first electronic device 401, and the second electronic device 402 may emit the signal of the first communication circuit 423a for authentication.

In certain embodiments, in operation 807, when performing the communication connection and authentication procedures with the first electronic device 401, the second electronic device 402 may transmit ID information (identification) on the second electronic device 402 to the first electronic device 401. For example, the ID information on the second electronic device 402 is 4-byte data, and may be information on an accessory type and service information of the second electronic device 402.

In certain embodiments, the second electronic device 402 may determine, in operation 809, whether the communication connection and the authentication are completed, under the control of the processor 422.

In certain embodiments, the second electronic device 402 may proceed to operation 811 if it is determined, in operation 809, that the communication connection and the authentication are completed, under the control of the processor 422.

In certain embodiments, the second electronic device 402 may proceed to operation 813 if it is determined, in operation 809, that the communication connection and the authentication fail, under the control of the processor 422.

In certain embodiments, if the communication connection and the authentication are completed, the second electronic device 402 may transmit power to the first electronic device 401 in a second power level in operation 811 under the control of the processor 422.

In certain embodiments, if the communication connection and the authentication fail, the second electronic device 402 may transmit power to the first electronic device 401 in the first power level in operation 813 under the control of the processor 422.

The first power level may be lower than the second power level. For example, the first power level may be a power level required for a normal charging rate, and the second power level may be a power level required for a high speed charging rate or super high speed charging.

Figure 9:
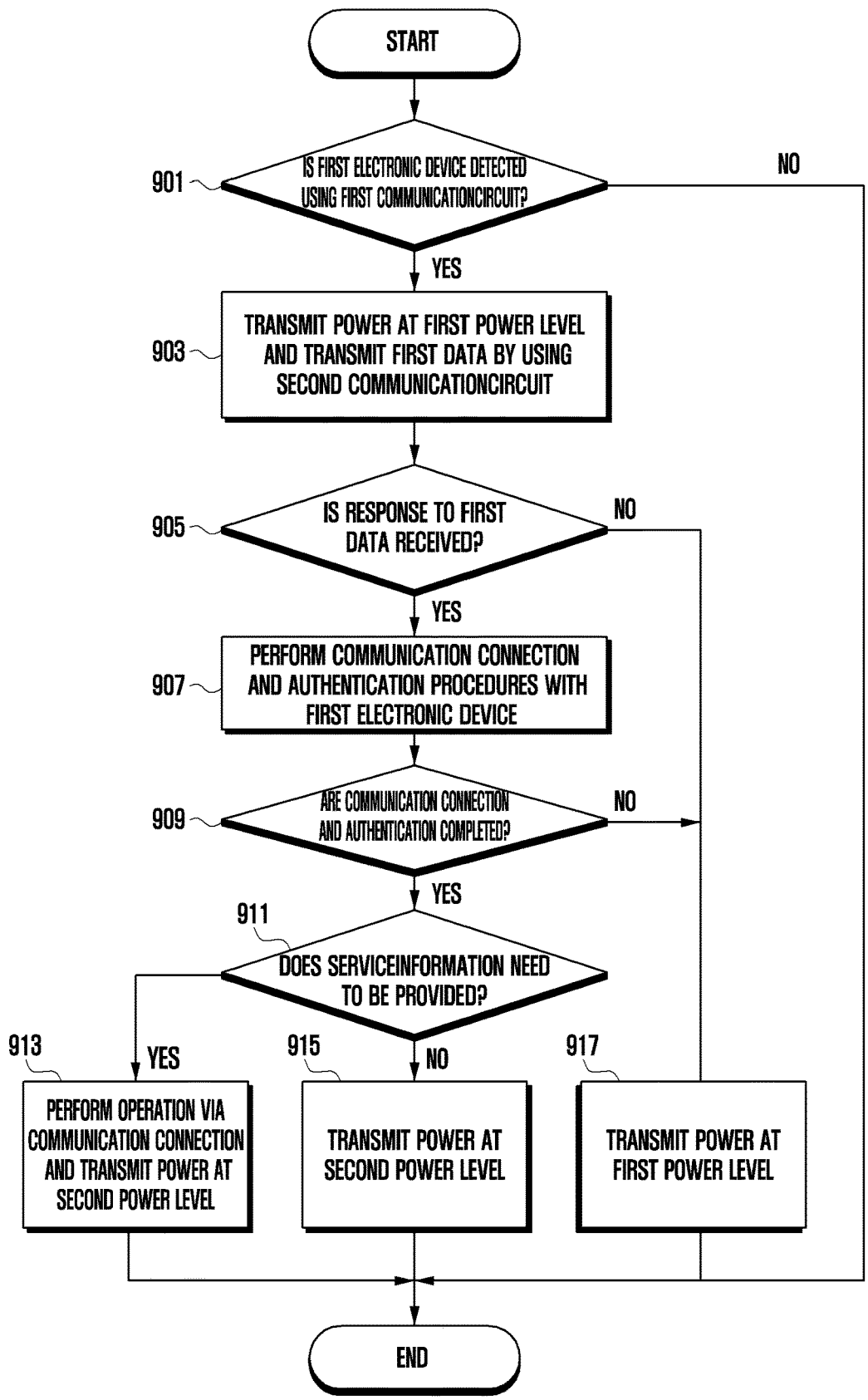
FIG. 9 is a flowchart relating to a method of authentication, power transmission, and service provision for the first electronic device by the second electronic device according to certain embodiments.

FIG. 9 is a flowchart relating to a method of authentication, power transmission, and service provision for the first electronic device 401 by the second electronic device 402 according to certain embodiments.

In certain embodiments, in operation 901, the second electronic device 402 may determine whether the first electronic device 401 is detected using the first communication circuit 423a, under the control of the processor 422.

In certain embodiments, the first electronic device 401 may be located on the second electronic device 402 (e.g., a charging pad area) so as to charge the battery 411e. The first electronic device 401 may be located close to the transmission coil 421L of the second electronic device 402.

In certain embodiments, the first communication circuit 423a of the second electronic device 402 and the first communication circuit 413a of the first electronic device 401 may communicate in an inband scheme. The first communication circuit 423a of the second electronic device 402 may communicate with the first electronic device 401 by using the transmission coil 421L for transferring power to the first electronic device 401 (e.g., the electronic device 101 of FIG. 1). The first communication circuit 413a of the first electronic device 401 may communicate with the second electronic device 402 by using a reception coil 411L for receiving power from the second electronic device 402 (the electronic device 102 of FIG. 1). The first electronic device 401 and the second electronic device 402 may communicate using coils 411L and 421L for power transmission or reception.

In certain embodiments, the first electronic device 401 and the second electronic device 402 may exchange information required for wireless power transmission via inband communication according to a wireless power consortium (WPC) standard. For example, inband communication may be a scheme in which information can be exchanged between the first electronic device 401 and the second electronic device 402 via frequency or amplitude modulation of a wireless power transmission signal in a wireless power transmission situation between the coil 411L and the coil 421L. The information may be, for example, IDs (e.g., model names or identification information of the electronic devices) or charging operation mode information (e.g., information on transmitted/received power and voltage, information on rectification, and information for changing an operation mode) of the electronic devices 401 and the 402.

In certain embodiments, in operation 901, the second electronic device 402 may exchange information and determine whether the first electronic device 401 is detected, by using the first communication circuit 423a under the control of the processor 422.

In certain embodiments, in operation 903, the second electronic device 402 may transmit power of a first power level to the first electronic device 401 and may transmit first data by using the second communication circuit 423b, under the control of the processor 422. In certain embodiments, in operation 903, the first data transmitted using the second communication circuit 423b may be data for discovery or advertisement for communication connection. For example, the first data transmitted using the second communication circuit 423b may be an advertising packet or scanning/discovery data. For example, if the first electronic device 401 has been already authenticated and the second electronic device 402 stores an address of the first electronic device 401, the first data transmitted using the second communication circuit 423b may be data transmitted based on address data for the first electronic device 401 or may be an advertising packet. For example, the second communication circuit 423b may use at least one of Bluetooth, low power Bluetooth, Wi-Fi, and Wi-Fi Direct.

If IDs (e.g., the model name or identification information of the electronic device) or charging operation mode information (e.g., information on transmitted/received power and voltage and rectification, and information for changing an operation mode) of the electronic devices 401 and 402 is exchanged via the first communication circuit 423a, the second electronic device 402 may transmit, in operation 903, power to the first electronic device 401 in the first power level via the coil 421L on the basis of the model name, identification information, or charging operation mode information of the first electronic device 401.

In certain embodiments, in operation 905, the second electronic device 402 may determine whether a response to the first data has been received from the first electronic device 401, under the control of the processor 422.

In certain embodiments, in operation 905, the second electronic device 402 may proceed to operation 907 if the response to the first data is received from the first electronic device 401, under the control of the processor 422.

In certain embodiments, in operation 905, the second electronic device 402 may proceed to operation 917 if no response to the first data is received from the first electronic device 401, under the control of the processor 422.

In certain embodiments, the first electronic device 401 may transmit the response to the first data, which is received from the second electronic device 402, under the control of the processor 412.

In certain embodiments, under the control of the processor 412, the first electronic device 401 may transmit the response to the first data, which is received from the second electronic device 402, while receiving power from the second electronic device 402.

In certain embodiments, if the response to the first data is received, the second electronic device 402 may perform communication connection and authentication procedures with the first electronic device 401, in operation 907, under the control of the processor 422.

In certain embodiments, in operation 907, the second electronic device 402 may perform authentication and communication connection with the first electronic device 401 by using a public key request operation and a public key response operation.

In certain embodiments, if the response to the first data is received, when the second electronic device 402 performs the communication connection and authentication procedures with the first electronic device 401 in operation 907 under the control of the processor 422, the second electronic device 402 may exchange encrypted information by using the security module 425.

In certain embodiments, if the response to the first data is received, when the second electronic device 402 performs the communication connection and authentication procedures with the first electronic device 401 in operation 907 under the control of the processor 422, the second electronic device 402 may exchange encrypted information by using the processor 422.

In certain embodiments, in operation 907, when performing the communication connection and authentication procedures with the first electronic device 401, the second electronic device 402 may receive an address (e.g., MAC address) required for communication connection from the first electronic device 401.

For example, when the first data is sensed, the first electronic device 401 may transmit a response signal for the first data. The second electronic device 402 may receive a request signal for Bluetooth or low-power Bluetooth connection from the first electronic device 401, and the second electronic device 402 may emit a signal of the first communication circuit 423a for authentication. The second electronic device 402 may receive the request signal for communication connection via the second communication circuit 423b from the first electronic device 401, and the second electronic device 402 may emit the signal of the first communication circuit 423a for authentication.

In certain embodiments, in operation 907, when performing the communication connection and authentication procedures with the first electronic device 401, the second electronic device 402 may transmit ID information (identification) on the second electronic device 402 to the first electronic device 401. For example, the ID information on the second electronic device 402 is 4-byte data, and may be information on an accessory type and service information of the second electronic device 402.

In certain embodiments, the second electronic device 402 may determine, in operation 909, whether the communication connection and the authentication are completed, under the control of the processor 422.

In certain embodiments, the second electronic device 402 may proceed to operation 911 if it is determined, in operation 909, that the communication connection and the authentication are completed, under the control of the processor 422.

In certain embodiments, the second electronic device 402 may proceed to operation 917 if it is determined, in operation 909, that the communication connection and the authentication fail, under the control of the processor 422.

In certain embodiments, the second electronic device 402 may determine, in operation 911, whether service information needs to be provided, under the control of the processor 422.

In certain embodiments, the determination on whether the service information needs to be provided, which is made by the second electronic device 402 in operation 911 under the control of the processor 422 may include, for example, determining whether the service information needs to be provided, via reception of service-related information from the first electronic device 401 or via transmission of the service-related information to the first electronic device 401.

In certain embodiments, the second electronic device 402 may proceed to operation 913 if it is determined, in operation 911, that the service information needs to be provided, under the control of the processor 422.

In certain embodiments, the second electronic device 402 may proceed to operation 915 if it is determined, in operation 911, that the service information does not need to be provided, under the control of the processor 422.

In certain embodiments, if the communication connection and the authentication are completed, and then if it is determined that the service information needs to be provided, the second electronic device 402 may, in operation 913, transmit power to the first electronic device 401 in the second power level and provide the service information via communication connection, under the control of the processor 422.

In certain embodiments, if it is determined that the service information needs to be provided, the second electronic device 402 may transmit the second data related to the service to the first electronic device 401 in operation 913 under the control of the processor 422.

According to certain embodiments, in operation 913, the second electronic device 402 may encrypt the second data related to the service and may transmit or receive the encrypted data, via the security module 425.

According to certain embodiments, in operation 913, the second electronic device 402 may encrypt the service information and provide the encrypted service information by communication connection, via the security module 425.

According to certain embodiments, in operation 913, the second electronic device 402 may encrypt the second data related to the service and may transmit or receive the encrypted data, via the processor 422.

According to certain embodiments, in operation 913, the second electronic device 402 may encrypt the service information and provide the encrypted service information by communication connection, via the processor 422.

In certain embodiments, if it is determined that the service information needs to be provided, the second electronic device 402 may transmit/receive the second data related to the service to/from the first electronic device 401 in operation 913 under the control of the processor 422. For example, the service may include an update service, an audio transmission/reception service, and/or a content-related service of the second electronic device 402. The content-related service may include at least one of an address (e.g., uniform resource locator (URL)) for Internet access, a font, a background screen, or a skin. The service may be information related to a call, music playback, and content download. The content-related service may be information related to a call, music playback, and content download.

In certain embodiments, if the first electronic device 401 receives the second data related to the service from the second electronic device 402, the first electronic device 401 may receive service-related information by communication connection to an external electronic device (e.g., the electronic device 104 of FIG. 1) or a server (e.g., the server 108 of FIG. 1) via a communication module (e.g., the communication module 190 of FIG. 1) on the basis of the second data. If the first electronic device 401 receives the service-related information from the external electronic device (e.g., the electronic device 104 of FIG. 1) or the server (e.g., the server 108 of FIG. 1) via the communication module (e.g., the communication module 190 of FIG. 1), the first electronic device 401 may store the received information in a memory (e.g., the memory 130 of FIG. 1) or may display the received information on a display (e.g., the display device 160 of FIG. 1).

In certain embodiments, in operation 913, the second data related to the service of the second electronic device 402 may be information on an Internet address (e.g., URL) and a service ID associated with information on a content-related service, an audio transmission/reception service, and/or an update service of the second electronic device 402.

In certain embodiments, in operation 913, the second electronic device 402 may transmit/receive advanced audio distribution profile (A2DP) information, headset profile (HSP) information, and/or handsfree profile (HFP) information to/from the first electronic device 401.

In certain embodiments, if the communication connection and the authentication are completed, and if it is determined that the service information does not need to be provided, the second electronic device 402 may transmit power to the first electronic device 401 in the second power level in operation 915 under the control of the processor 422.

In certain embodiments, if a response to the first data cannot be received, the second electronic device 402 may transmit power to the first electronic device 401 in the first power level in operation 917 under the control of the processor 422.

In certain embodiments, if the communication connection and the authentication fail, the second electronic device 402 may transmit power to the first electronic device 401 in the first power level in operation 917 under the control of the processor 422.

The first power level may be lower than the second power level. For example, the first power level may be a power level required for a normal charging rate, and the second power level may be a power level required for a high speed charging rate or ultra-high speed charging.

Figure 10A:
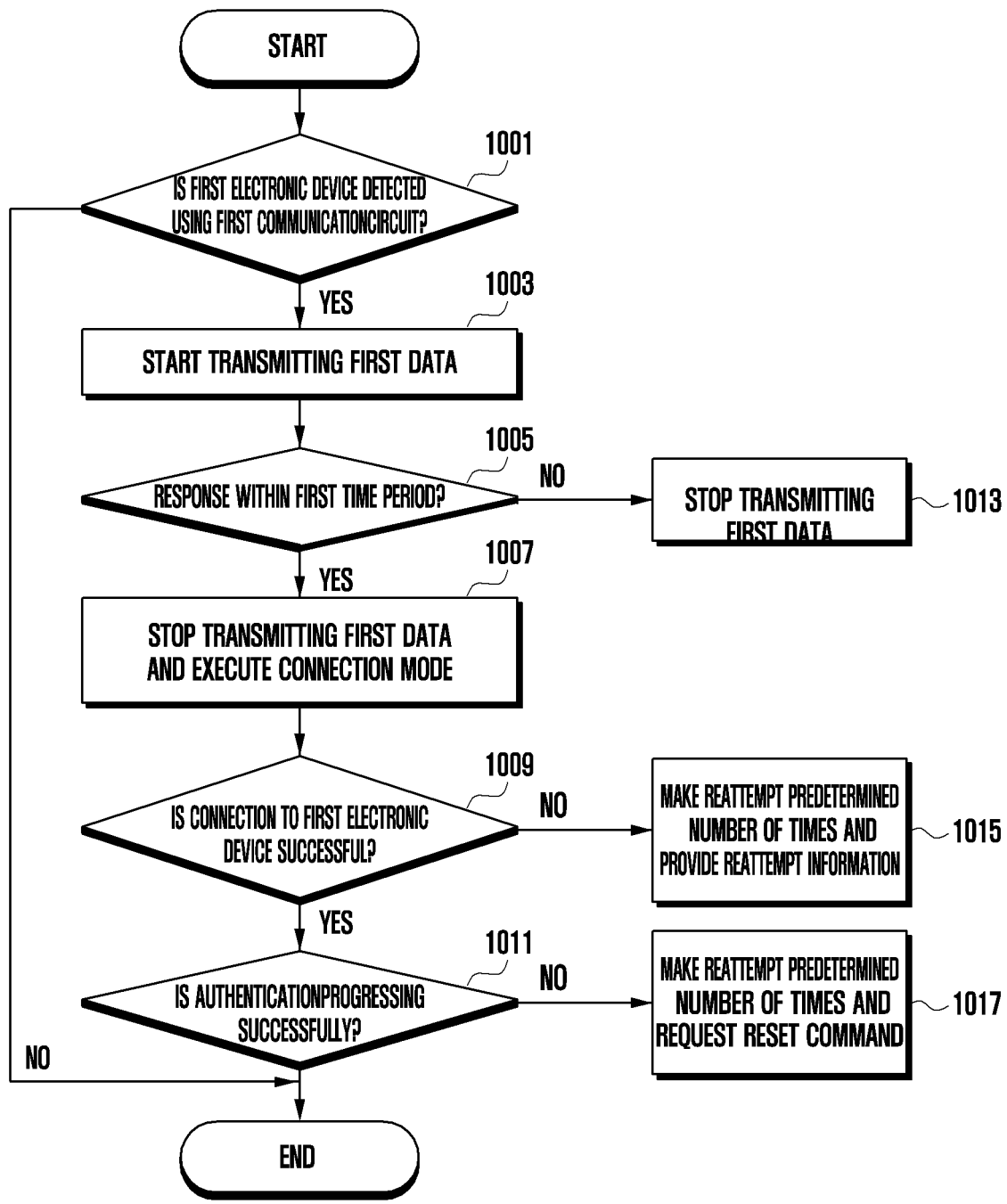
FIG. 10A is a flowchart relating to a method of communication connection and authentication for the first electronic device by the second electronic device according to certain embodiments.

FIG. 10A is a flowchart relating to a method of communication connection and authentication for the first electronic device 401 by the second electronic device 402 according to certain embodiments.

In certain embodiments, in operation 1001, the second electronic device 402 may determine whether the first electronic device 401 is detected using the first communication circuit 423a, under the control of the processor 422.

In certain embodiments, the first electronic device 401 may be located on the second electronic device 402 (e.g., a charging pad area) so as to charge the battery 411e. The first electronic device 401 may be located close to the transmission coil 421L of the second electronic device 402.

In certain embodiments, the first communication circuit 423a of the second electronic device 402 and the first communication circuit 413a of the first electronic device 401 may communicate in an inband scheme. The first communication circuit 423a of the second electronic device 402 may communicate with the first electronic device 401 by using the transmission coil 421L for transferring power to the first electronic device 401 (e.g., the electronic device 101 of FIG. 1). The first communication circuit 413a of the first electronic device 401 may communicate with the second electronic device 402 by using a reception coil 411L for receiving power from the second electronic device 402 (the electronic device 102 of FIG. 1). The first electronic device 401 and the second electronic device 402 may communicate using coils 411L and 421L for power transmission or reception.

In certain embodiments, the first electronic device 401 and the second electronic device 402 may exchange information required for wireless power transmission via inband communication according to a wireless power consortium (WPC) standard. For example, inband communication may be a scheme in which information can be exchanged between the first electronic device 401 and the second electronic device 402 via frequency or amplitude modulation of a wireless power transmission signal in a wireless power transmission situation between the coil 411L and the coil 421L. The information may be, for example, IDs (e.g., model names or identification information of the electronic devices) or charging operation mode information (e.g., information on transmitted/received power and voltage, information on rectification, and information for changing an operation mode) of the electronic devices 401 the 402.

In certain embodiments, in operation 1001, the second electronic device 402 may exchange information and determine whether the first electronic device 401 is detected, by using the first communication circuit 423a under the control of the processor 422.

In certain embodiments, if it is determined, in operation 1001, that the first electronic device 401 is detected using the first communication circuit 423a, the second electronic device 402 may proceed to operation 1003, under the control of the processor 422.

In certain embodiments, in operation 1013, the second electronic device 402 may stop transmission of first data via the second communication circuit 423b, under the control of the processor 422.

In certain embodiments, in operation 1003, the second electronic device 402 may transmit power to the first electronic device 401 and may transmit first data by using the second communication circuit 423b, under the control of the processor 422. In certain embodiments, in operation 703, the first data transmitted using the second communication circuit 423b may be data for discovery or advertisement for communication connection. For example, the first data transmitted using the second communication circuit 423b may be an advertising packet or scanning/discovery data. For example, if the first electronic device 401 has been already authenticated and the second electronic device 402 stores an address of the first electronic device 401, the first data transmitted using the second communication circuit 423b may be data transmitted based on address data for the first electronic device 401 or may be an advertising packet. For example, the second communication circuit 423b may use at least one of Bluetooth, low power Bluetooth, Wi-Fi, and Wi-Fi Direct.

In certain embodiments, in operation 1005, the second electronic device 402 may determine whether a response to the first data has been received within a first time period from the first electronic device 401, under the control of the processor 422. The first time period is, for example, a predetermined time period and may be within several seconds.

In certain embodiments, the second electronic device 402 may proceed to operation 1007 under the control of the processor 422 if the response to the first data has been received within the first time period from the first electronic device 401 in operation 1005.

In certain embodiments, the second electronic device 402 may proceed to operation 1013 under the control of the processor 422 if no response to the first data has been received within the first time period from the first electronic device 401 in operation 1005.

In certain embodiments, if the response to the first data is received within the first time period from the first electronic device 401, the second electronic device 402 may stop transmitting the first data via the second communication circuit 423b and may execute a communication connection mode for communication connection to the first electronic device 401, in operation 1007 under the control of the processor 422.

In certain embodiments, in operation 1007, when performing communication connection to the first electronic device 401, the second electronic device 402 may receive an address (e.g., MAC address) required for the communication connection from the first electronic device 401.

In certain embodiments, the second electronic device 402 may determine whether the communication connection to the first electronic device 401 is successful, in operation 1009 under the control of the processor 422.

In certain embodiments, the determination on whether the communication connection to the first electronic device 401 is successful, which is made by the second electronic device 402 in operation 1009 under the control of the processor 422 may be an inquiry or paging connection of Bluetooth or low power Bluetooth (BLE).

In certain embodiments, the second electronic device 402 may proceed to operation 1011 if the communication connection to the first electronic device 401 is successful, in operation 1009 under the control of the processor 422.

In certain embodiments, the second electronic device 402 may proceed to operation 1015 if the communication connection to the first electronic device 401 fails, in operation 1009 under the control of the processor 422.

In certain embodiments, if the communication connection to the first electronic device 401 fails, the second electronic device 402 may make a reattempt of the communication connection a predetermined number of times and may provide information on the reattempt and success/failure to the first electronic device 401, in operation 1015 under the control of the processor 422.

In certain embodiments, if the communication connection to the first electronic device 401 is successful, the second electronic device 402 may perform authentication with the first electronic device 401 and may determine whether the authentication is successful, in operation 1011 under the control of the processor 422. According to certain embodiments, in operation 1101, the security module 425 may be connected to the processor 422 and/or the second communication circuit 423*b* so as to transmit or receive data. The security module 425 may perform an authentication procedure while transmitting data to or receiving data from the processor 422 and/or the second communication circuit 423*b*.

According to certain embodiments, in operation 1101, the processor 422 and/or the second communication circuit 423*b* may be connected to the security module 425 so as to perform control to transmit/receive encrypted data stored in the security module to/from another electronic device. The processor 422 and/or the second communication circuit 423*b* may transmit or receive encrypted data by using the security module 425.

In certain embodiments, in operation 1011, under the control of the processor 422, the second electronic device 402 may perform the authentication procedure with the first electronic device 401, and if authentication fails, the second electronic device 402 may proceed to operation 1017.

In certain embodiments, in operation 1011, when performing the authentication procedure with the first electronic device 401, the second electronic device 402 may transmit ID information (identification) on the second electronic device 402 to the first electronic device 401. For example, the ID information on the second electronic device 402 is 4-byte data, and may be information on an accessory type and service information of the second electronic device 402.

In certain embodiments, if the authentication fails, the second electronic device 402 may make a reattempt of the communication connection a predetermined number of times and may request a reset command from the first electronic device 401, in operation 1017 under the control of the processor 422.

Figure 10B:
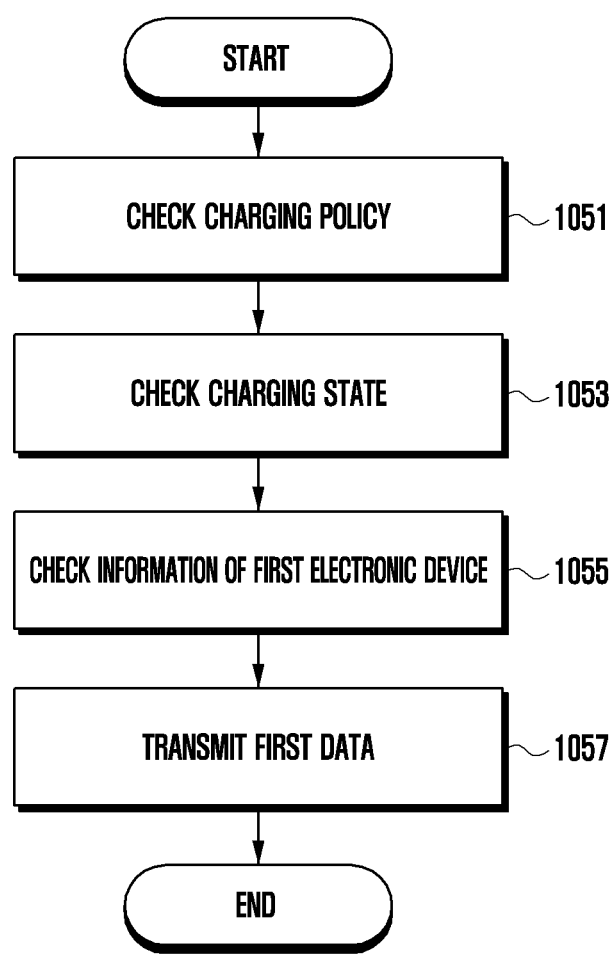
FIG. 10B is a flowchart relating to authentication by the second electronic device according to certain embodiments.

FIG. 10B is a flowchart relating to authentication by the second electronic device 402 according to certain embodiments.

In certain embodiments, the second electronic device 402 may check a charging policy of the first electronic device 401 in operation 1051 under the control of the processor 422.

In certain embodiments, if the first electronic device 401 exchanges information by using the first communication circuit 423*a* and the first electronic device 401 is detected, the second electronic device 402 may check the charging policy of the first electronic device 401 in operation 1051 under the control of the processor 422.

In certain embodiments, the second electronic device 402 may check a power state (e.g., voltage, current, and power) of the first electronic device 401 in operation 1053 under the control of the processor 422. Depending on a charging state, the second electronic device 402 may wait for charging of the first electronic device 401, and may provide power at a first power level (e.g., normal power transmission) or a second power level (e.g., high speed or ultra-high speed power transmission).

In certain embodiments, the second electronic device 402 may check information of the first electronic device 401 in operation 1055 under the control of the processor 422.

In certain embodiments, the second electronic device 402 may check ID information (e.g., a communication ID and an accessory ID) of the first electronic device 401 in operation 1055 under the control of the processor 422.

In certain embodiments, the second electronic device 402 may transmit the first data to the first electronic device 401 in operation 1057 under the control of the processor 422. The first data transmitted using the second communication circuit 423*b* may be data for discovery or advertisement for communication connection. For example, the first data transmitted using the second communication circuit 423*b* may be an advertising packet or scanning/discovery data. For example, if the first electronic device 401 has been already authenticated and the second electronic device 402 stores an address of the first electronic device 401, the first data transmitted using the second communication circuit 423*b* may be data transmitted based on address data for the first electronic device 401 or may be an advertising packet. For example, the second communication circuit 423*b* may use at least one of Bluetooth, low power Bluetooth, Wi-Fi, and Wi-Fi Direct.

Figure 11:
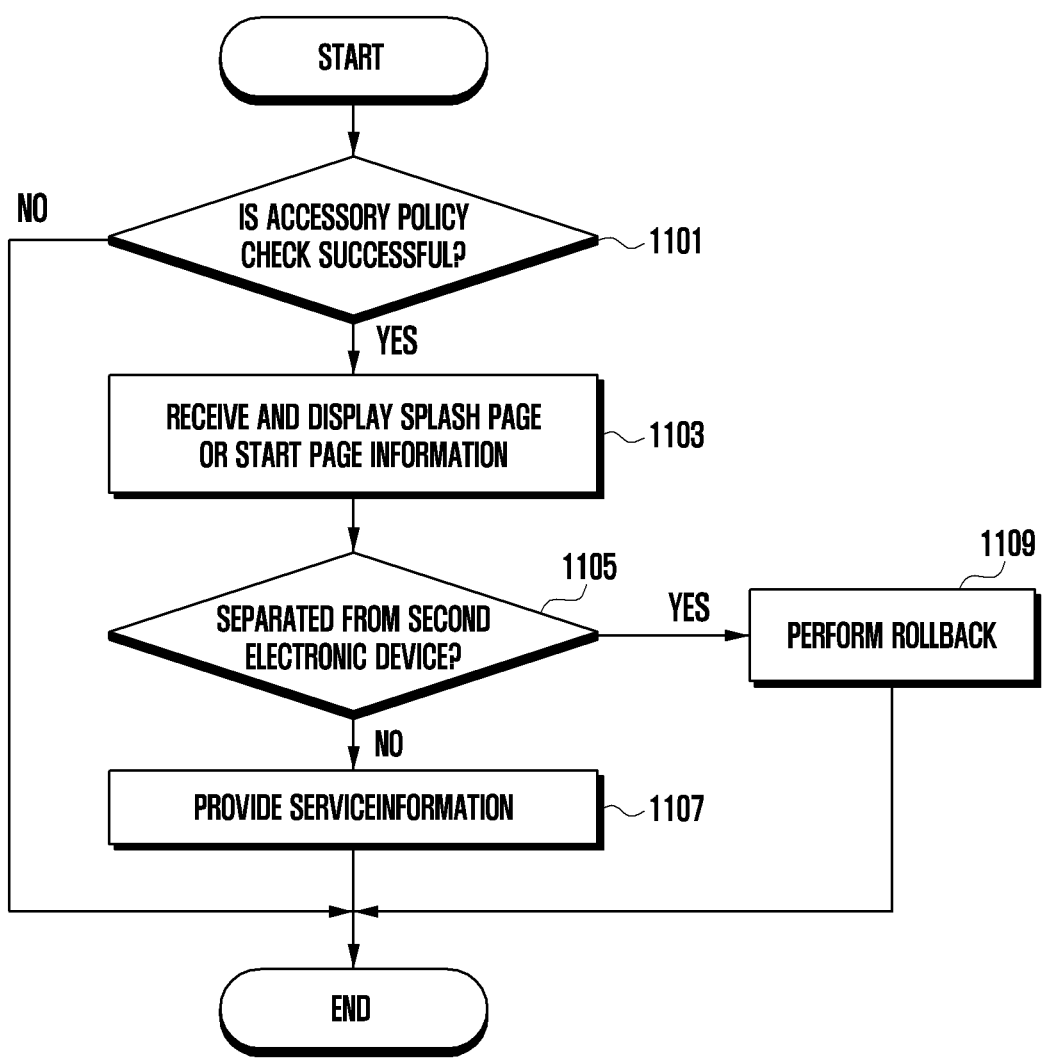
FIG. 11 is a flowchart relating to a method of providing a service after authentication of the first electronic device according to certain embodiments.

FIG. 11 is a flowchart relating to a method of providing a service after authentication of the first electronic device 401 according to certain embodiments.

In certain embodiments, the first electronic device 401 may determine whether an accessory policy is checked, in operation 1101 under the control of the processor 412.

In certain embodiments, the second electronic device 402 may transmit service-related information to the first electronic device 401 during an authentication procedure or a service information providing procedure for the first electronic device 401, and the first electronic device 401 may determine whether the accessory policy is checked according to the received service-related information, in operation 1101 under the control of the processor 412.

In certain embodiments, when performing the authentication procedure, the second electronic device 402 may transfer ID information (identification) relating to the second electronic device 402 to the first electronic device 401. For example, the ID information on the second electronic device 402 is 4-byte data, and may be information on an accessory type and service information of the second electronic device 402.

In certain embodiments, the first electronic device 401 may determine whether the accessory policy is checked using the ID information on the second electronic device 402, in operation 1101 under the control of the processor 412.

In certain embodiments, the first electronic device 401 may proceed to operation 1103 if the accessory policy is checked in operation 1101 under the control of the processor 412.

In certain embodiments, the first electronic device 401 may receive and display information on a splash page or start page from the second electronic device 402, in operation 1103 under the control of the processor 412.

In certain embodiments, the first electronic device 401 may receive information relating to an update service, an audio transmission/reception service, and/or a content-related service of the second electronic device 402.

The content-related service may include at least one of an address (e.g., uniform resource locator (URL)) for Internet access, a font, a background screen, or a skin.

In certain embodiments, the first electronic device 401 may receive, from the second electronic device 402, information on an Internet address (e.g., URL) and a service ID associated with information on a content-related service, an audio transmission/reception service, and/or an update service. The service may be information related to a call, music playback, and content download. The content-related service may be information related to a call, music playback, and content download.

In certain embodiments, if the first electronic device 401 receives the second data related to the service from the second electronic device 402, the first electronic device 401 may receive service-related information by communication connection to an external electronic device (e.g., the electronic device 104 of FIG. 1) or a server (e.g., the server 108 of FIG. 1) via a communication module (e.g., the communication module 190 of FIG. 1) on the basis of the second data. If the first electronic device 401 receives the service-related information from the external electronic device (e.g., the electronic device 104 of FIG. 1) or the server (e.g., the server 108 of FIG. 1) via the communication module (e.g., the communication module 190 of FIG. 1), the first electronic device 401 may store the received information in a memory (e.g., the memory 130 of FIG. 1) or may display the received information on a display (e.g., the display device 160 of FIG. 1).

In certain embodiments, in operation 1103, under the control of the processor 412, the first electronic device 401 may receive access information on the splash page or start page from the second electronic device 402 and may receive information on the splash page or start page from an external electronic device (e.g., a server) so as to display the received information on the display 415. The access information on the flash page or start page, which is received from the second electronic device 402, may be information for displaying content information related to the second electronic device 402 or the first electronic device 401.

In certain embodiments, the first electronic device 401 may determine whether the first electronic device 401 is separated from the second electronic device 402, in operation 1105 under the control of the processor 412. The first electronic device 401 may determine whether the first electronic device 401 is separated from the second electronic device 402, on the basis of power or information received via the coil 411L of the first communication circuit 413a.

In certain embodiments, the first electronic device 401 may proceed to operation 1109 if it is determined that the first electronic device 401 is separated from the second electronic device 402, in operation 1105 under the control of the processor 412.

In certain embodiments, the first electronic device 401 may proceed to operation 1107, if it is determined that the first electronic device 401 is attached to the second electronic device 402 without being separated therefrom, in operation 1105 under the control of the processor 412.

In certain embodiments, if it is determined that the first electronic device 401 is separated from the second electronic device 402, the first electronic device 401 may perform rollback in operation 1109 under the control of the processor 412. In operation 1109, the rollback may be returning to a state configured before the accessory policy check by the first electronic device 401.

In certain embodiments, if it is determined that the first electronic device 401 is attached to the second electronic device 402, the first electronic device 401 may provide service information in operation 1107 under the control of the processor 412. In certain embodiments, providing of the service information by the first electronic device 401 under the control of the processor 412 in operation 1107 may include accessing the external electronic device (e.g., a server) to provide contents (e.g., music and skin), etc. on the basis of content information received from the second electronic device 402.

Figure 12:
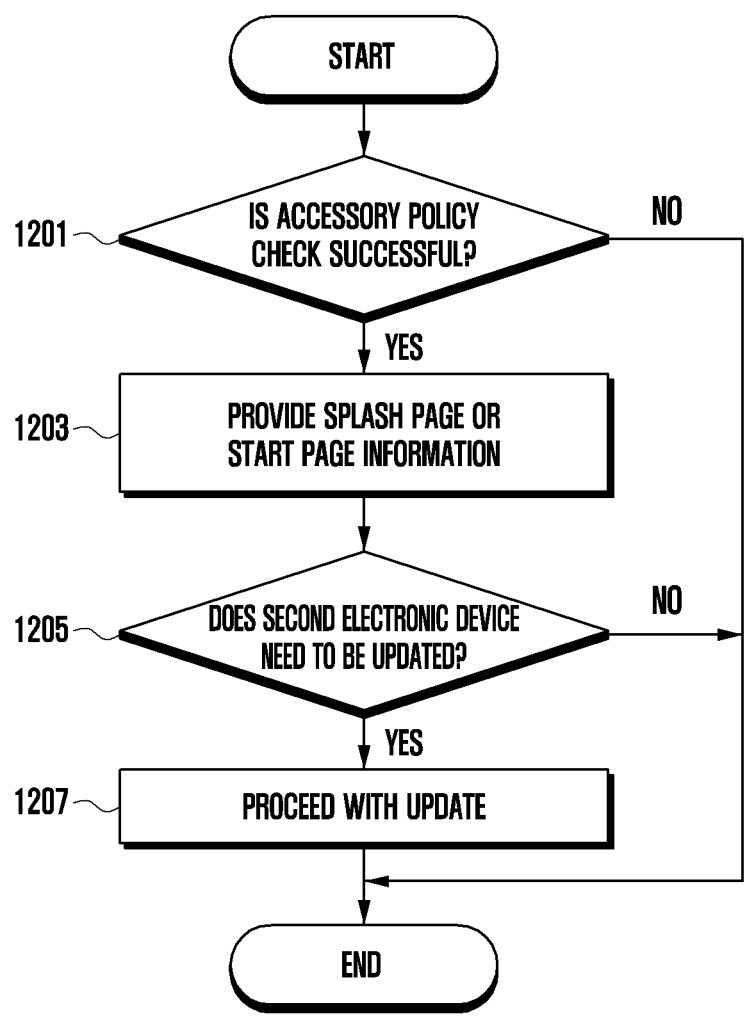
FIG. 12 is a flowchart relating to a method of updating a service after authentication of the first electronic device according to certain embodiments.

FIG. 12 is a flowchart relating to a method of updating a service after authentication of the first electronic device 401 according to certain embodiments.

In certain embodiments, the first electronic device 401 may determine whether an accessory policy is checked, in operation 1201 under the control of the processor 412.

In certain embodiments, the second electronic device 402 may transmit service-related information to the first electronic device 401 during an authentication procedure or a service information providing procedure for the first electronic device 401, and the first electronic device 401 may determine whether the accessory policy is checked according to the received service-related information, in operation 1101 under the control of the processor 412.

In certain embodiments, when performing the authentication procedure, the second electronic device 402 may transfer ID information (identification) relating to the second electronic device 402 to the first electronic device 401. For example, the ID information on the second electronic device 402 is 4-byte data, and may be information on an accessory type and service information of the second electronic device 402.

In certain embodiments, the first electronic device 401 may determine whether the accessory policy is checked using the ID information on the second electronic device 402, in operation 1201 under the control of the processor 412.

In certain embodiments, the first electronic device 401 may proceed to operation 1203 if the accessory policy is checked in operation 1201 under the control of the processor 412.

In certain embodiments, the first electronic device 401 may receive and display information on a splash page or start page from the second electronic device 402, in operation 1203 under the control of the processor 412.

In certain embodiments, the first electronic device 401 may receive information relating to an update service, an audio transmission/reception service, and/or a content-related service of the second electronic device 402.

The content-related service may include at least one of an address (e.g., uniform resource locator (URL)) for Internet access, a font, a background screen, or a skin.

In certain embodiments, the first electronic device 401 may receive, from the second electronic device 402, information on an Internet address (e.g., URL) and a service ID associated with information on a content-related service, an audio transmission/reception service, and/or an update service. The service may be information related to a call, music playback, and content download. The content-related service may be information related to a call, music playback, and content download.

In certain embodiments, if the first electronic device 401 receives the second data related to the service from the second electronic device 402, the first electronic device 401 may receive service-related information by communication connection to an external electronic device (e.g., the electronic device 104 of FIG. 1) or a server (e.g., the server 108 of FIG. 1) via a communication module (e.g., the communication module 190 of FIG. 1) on the basis of the second data. If the first electronic device 401 receives the service-related information from the external electronic device (e.g., the electronic device 104 of FIG. 1) or the server (e.g., the server 108 of FIG. 1) via the communication module (e.g., the communication module 190 of FIG. 1), the first electronic device 401 may store the received information in a memory (e.g., the memory 130 of FIG. 1) or may display the received information on a display (e.g., the display device 160 of FIG. 1).

In certain embodiments, in operation 1203, under the control of the processor 412, the first electronic device 401 may receive access information on the splash page or start page from the second electronic device 402 and may receive information on the splash page or start page from an external electronic device (e.g., a server) so as to display the received information on the display 415. The access information on the flash page or start page, which is received from the second electronic device 402, may be information for displaying content information related to the second electronic device 402 or the first electronic device 401.

In certain embodiments, the first electronic device 401 may determine whether the second electronic device 402 needs to be updated, on the basis of the service information received from the second electronic device 402, in operation 1205 under the control of the processor 412.

In certain embodiments, the first electronic device 401 may proceed to operation 1207 if it is determined that the second electronic device 402 needs to be updated, on the basis of the service information received from the second electronic device 402, in operation 1205 under the control of the processor 412.

In certain embodiments, if it is determined that the second electronic device 402 needs to be updated, on the basis of the service information received from the second electronic device 402, the first electronic device 401 may transmit, to the second electronic device 402, information necessary for updating the second electronic device 402 via the second communication circuit 413b so as to update the second electronic device 402, in operation 1205 under the control of the processor 412. The information necessary for updating the second electronic device 402 may be information received from an external electronic device (e.g., a server) or information stored in advance by the first electronic device 401.

Figure 13:
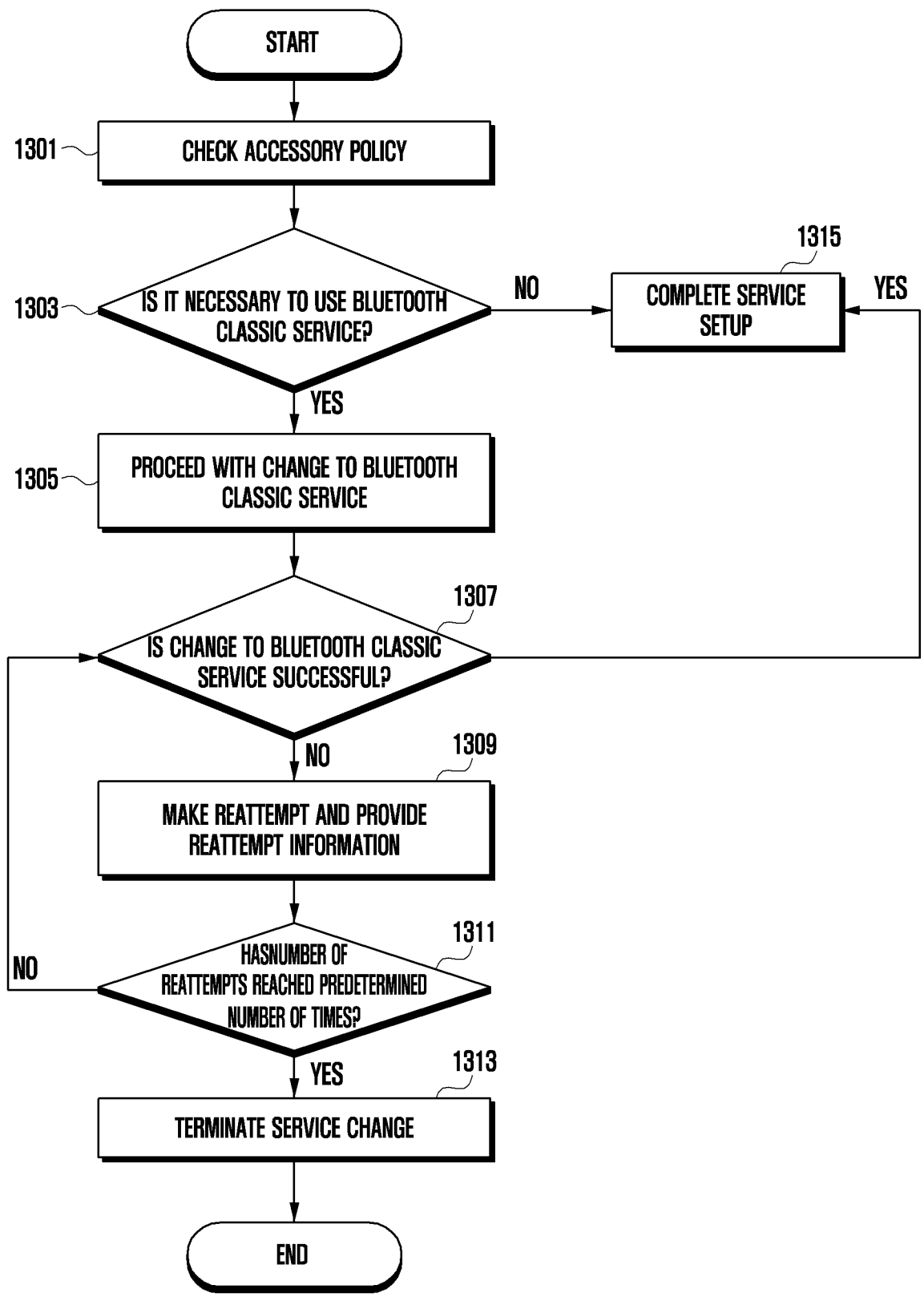
FIG. 13 is a flowchart relating to a method of updating a service after authentication of the first electronic device according to certain embodiments.

FIG. 13 is a flowchart relating to a method of updating a service after authentication of the first electronic device 401 according to certain embodiments.

In certain embodiments, the first electronic device 401 may determine whether an accessory policy is checked, in operation 1301 under the control of the processor 412.

In certain embodiments, the second electronic device 402 may transmit service-related information to the first electronic device 401 during an authentication procedure or a service information providing procedure for the first electronic device 401, and the first electronic device 401 may determine whether the accessory policy is checked according to the received service-related information, in operation 1101 under the control of the processor 412.

In certain embodiments, when performing the authentication procedure, the second electronic device 402 may transfer ID information (identification) relating to the second electronic device 402 to the first electronic device 401. For example, the ID information on the second electronic device 402 is 4-byte data, and may be information on an accessory type and service information of the second electronic device 402.

In certain embodiments, the first electronic device 401 may determine whether the accessory policy is checked using the ID information on the second electronic device 402, in operation 1301 under the control of the processor 412.

In certain embodiments, the first electronic device 401 may check policy information relating to whether another communication channel (e.g., BLE, Bluetooth Classic, and Wi-Fi Direct) can be used based on the ID information on the second electronic device 402, which is provided by the second electronic device 402.

In certain embodiments, the first electronic device 401 may determine whether it is necessary to use a Bluetooth Classic service, in operation 1303 under the control of the processor 412.

In certain embodiments, the first electronic device 401 may proceed to operation 1315 if there is no need to use a Bluetooth Classic service, in operation 1303 under the control of the processor 412.

In certain embodiments, the first electronic device 401 may proceed to operation 1305 if it is necessary to use the Bluetooth Classic service, in operation 1303 under the control of the processor 412.

If it is determined that the Bluetooth Classic service is required, in certain embodiments, the first electronic device 401 may proceed with communication connection to the second electronic device 402 by using the Bluetooth Classic service, in operation 1305 under the control of the processor 412.

In certain embodiments, the first electronic device 401 may determine whether a change to the Bluetooth Classic service is successful, in operation 1307 under the control of the processor 412.

In certain embodiments, the first electronic device 401 may proceed to operation 1315 if it is determined that the change to the Bluetooth Classic service has been successful, in operation 1307 under the control of the processor 412.

In certain embodiments, the first electronic device 401 may proceed to operation 1309 if it is determined that the change to the Bluetooth Classic service fails, in operation 1307 under the control of the processor 412.

If it is determined that the change to the Bluetooth Classic service fails, in certain embodiments, the first electronic device 401 may make a reattempt to change to the Bluetooth Classic service and may provide information on the reattempt, in operation 1309 under the control of the processor 412. Providing of the information on the reattempt may include displaying the information on the reattempt on the display 415.

In certain embodiments, the first electronic device 401 may determine whether the number of reattempts to change to the Bluetooth Classic service has reached a predetermined number of times, in operation 1311 under the control of the processor 412.

In certain embodiments, if it is determined that the number of reattempts to change to the Bluetooth Classic service has not reached the predetermined number of times, the first electronic device 401 may proceed to operation 1307, in operation 1311 under the control of the processor 412.

In certain embodiments, the first electronic device 401 may proceed to operation 1313 if it is determined that the number of reattempts to change to the Bluetooth Classic service has reached the predetermined number of times, in operation 1311 under the control of the processor 412.

In certain embodiments, if the number of reattempts to change to the Bluetooth Classic service has reached the predetermined number of times, the first electronic device 401 may determine that the change fails, so as to terminate changing of the service, in operation 1313 under the control of the processor 412.

In certain embodiments, if the number of reattempts to change to the Bluetooth Classic service has reached the predetermined number of times, and the first electronic device 401 may determine that the change fails, so as to terminate changing of the service, the first electronic device 401 may display information relating to changing of the service on the display 415, in operation 1313 under the control of the processor 412.

FIG. 14 is a diagram illustrating a graph relating to power transmission of the second electronic device 402 according to certain embodiments.

The second electronic device 402 may intermittently transmit power to the first electronic device 401 during a ping operation.

Before authentication of the first electronic device 401 and the second electronic device 402 via the first communication module 423*a* is completed, and authentication via the second communication module 423*b* is completed, the second electronic device 402 may transmit power at a first power level.

If authentication of the first electronic device 401 and the second electronic device 402 via the first communication module 423*a* is completed, and authentication via the second communication module 423*b* is completed, the second electronic device 402 may transmit power at a second power level.

FIG. 15 is a diagram illustrating the first electronic device 401 and the second electronic device 402 according to certain embodiments.

The first electronic device 401 may receive access information on a splash page or start page from the second electronic device 402 and may receive information 1501 on the splash page or start page from an external electronic device (e.g., a server) so as to display the received information on the display 415.

According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturers server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

The electronic device according to certain embodiments may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

Although certain embodiments have been described with a degree of particularity, it should be understood that such embodiments can modified, and altered, have elements substituted or omitted, and changed in a variety of ways without departing from the scope of the disclosure as defined by the following claims and equivalents, thereof. Therefore, the embodiments are presented by way of example, and should be not be considered as limiting.

What is claimed is:

1. An authentication method of an electronic device, the method comprising:
responsive to detecting an attachment of an external electronic device using a first communication circuit including at least one coil for wireless power transmission, transmitting first data to the external electronic device using a second communication circuit including at least one short-range communication circuit;
responsive to detecting the attachment of the external electronic device using the first communication circuit, transmitting power to the external electronic device at a first power level;
determining whether a response to the first data is received;
when the response to the first data is received from the external electronic device, performing a communication connection and authentication procedures with the external electronic devices;
determining whether the communication connection and authentication procedures with the external electronic device are completed; and
when the communication connection and authentication procedures with the external electronic device are completed, transmitting power to the external electronic device at a second power level, and transmitting second data related to a service to the external electronic device,
wherein the second data include at least one of information on an Internet address and a service ID related to information on a call, music playback, content download, an update service, an audio transmission/reception service, or a content-related service.

2. The method of claim 1, further comprising:
when the communication connection and authentication procedures with the external electronic device fail, transmitting power to the external electronic device at the first power level.

3. The method of claim 1, wherein:
the response to the first data is data for a Bluetooth or Bluetooth low energy connection request; and
the method further comprising:
determining whether the external electronic device is detected using the first communication circuit by exchanging information with the external electronic device via inband communication according to a wireless power consortium (WPC) standard.

4. The method of claim 1, wherein the transmitting of the first data to the external electronic device by using the second communication circuit when the external electronic device is detected further comprises transmitting data for discovery or advertisement for a communication connection to the external electronic device.

5. An electronic device comprising:
a first communication circuit capable of performing communication using a coil for wireless power transmission;
a second communication circuit using a frequency band differing from a frequency transferred to the coil; and
at least one processor, wherein the at least one processor;
detects an attachment of an external electronic device using the first communication circuit;
responsive to detecting the attachment of the external electronic device using the first communication circuit, transmits power to the external electronic device at a first power level;
when the attachment of the external electronic device is detected, transmits first data to the external electronic device by using the second communication circuit;
determines whether a response to the first data is received;
when the response to the first data is received from the external electronic device, performs communication connection and authentication procedures with the external electronic device;
determines whether the communication connection and authentication procedures with the external electronic device are completed; and
when the communication connection and authentication procedures with the external electronic device are completed, transmits power to the external electronic device at a second power level, and transmits second data related to a service to the external electronic device, wherein the second data include at least one of information on an Internet address and a service ID related to information on a call, music playback, content download, an update service, an audio transmission/reception service, or a content-related service.

6. The electronic device of claim 5, wherein the at least one processor:
transmits power to the external electronic device at the first power level when the communication connection and authentication procedures with the external electronic device fail.

7. The electronic device of claim 5, wherein:
the response to the first data is data for a Bluetooth or Bluetooth low energy connection request; and
the at least one processor exchanges information with the external electronic device via inband communication according to a wireless power consortium (WPC) standard, and determines whether the external electronic device is detected.

8. The electronic device of claim 5, wherein the at least one processor transmits data for discovery or advertisement for a communication connection to the external electronic device.

* * * * *